US012531056B1

(12) United States Patent
Liu et al.

(10) Patent No.: US 12,531,056 B1
(45) Date of Patent: Jan. 20, 2026

(54) AUTOMATIC SPEECH RECOGNITION USING LANGUAGE MODEL-GENERATED CONTEXT

(71) Applicant: Amazon Technologies, Inc., Seattle, WA (US)

(72) Inventors: Jing Liu, Pittsburgh, PA (US); Mingzhi Yu, Bethel Park, PA (US); Sunwoo Kim, Pittsburgh, PA (US); Grant Strimel, Presto, PA (US); Ross William McGowan, Pittsburgh, PA (US); Kanthashree Mysore Sathyendra, Sunnyvale, CA (US); Andreas Stolcke, Berkeley, CA (US); Ariya Rastrow, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 227 days.

(21) Appl. No.: 18/541,315

(22) Filed: Dec. 15, 2023

(51) Int. Cl.
*G10L 15/26* (2006.01)
*G10L 15/06* (2013.01)
*G10L 15/16* (2006.01)
*G10L 15/22* (2006.01)
*H04L 67/306* (2022.01)

(52) U.S. Cl.
CPC ............ *G10L 15/16* (2013.01); *G10L 15/063* (2013.01); *G10L 15/22* (2013.01); *H04L 67/306* (2013.01); *G10L 2015/223* (2013.01)

(58) Field of Classification Search
CPC ....... G10L 15/16; G10L 15/063; G10L 15/22; G10L 2015/223; G10L 15/26; H04L 67/306
See application file for complete search history.

(56) References Cited

U.S. PATENT DOCUMENTS 12,130,848 B1 * 10/2024 Koneru .................. G06F 40/40
2023/0351118 A1 * 11/2023 Gelfenbeyn ............ G06F 40/35

OTHER PUBLICATIONS

Sainath, et al., "No need for a lexicon? Evaluation the value of the pronunciation lexica in end-to-end models", In 2018 IEEE International Conference on Acoustics, Speech and Signal Processing (ICASSP) (pp. 5859-5863). IEEE. Dec. 2017.
Jain, et al., "Contextual RNN-T For Open Domain ASR", Interspeech, Aug. 2020. arXiv preprint arXiv:2006.03411.
Bruguier, et al., "Learning personalized pronunciations for contact names recognition", 2016.
Pundak, et al., "Deep context: end-to-end contextual speech recognition", 2018 IEE Spoken Language Technology Workshop (SLT), IEEE, 2018, pp. 418-425.

(Continued)

*Primary Examiner* — Abul K Azad
(74) *Attorney, Agent, or Firm* — Pierce Atwood LLP

(57) ABSTRACT

Techniques for ASR processing using language model (LM)-generated context are described. A LM is prompted to generate words that are relevant for/may be included in a future user input. The prompt to the LM can include words from user interaction history, dialog history, dialog topic, user preferences, etc. The information included in the prompt may focus on rare or unique words rather than words that the ASR model is already confident in recognizing. The techniques can be plugged into an existing/pretrained ASR model and can be used with any existing/pretrained LM, thus saving resources needed to implement and maintain the components.

20 Claims, 9 Drawing Sheets

(56) References Cited

OTHER PUBLICATIONS

Le, et al., "Deep shallow fusion for RNN-T personalization", in 2021 IEEE Spoken Language Technology Workshop (SLT), 2021, pp. 251-257.
Zhao, et al., "Shallow-fusion end-to-end contextual biasing", Interspeech, 2019, pp. 1418-1422.
He, et al., "Streaming end-to-end speech recognition for mobile devices", ICASSP 2019-2019 IEEE International Conference on Acoustics, Speech and Signal Processing, IEEE, 2019, pp. 6381-6385.
Gourav, et al., "Personalization strategies for end-to-end speech recognition systems", in ICASSP 2021-2021 IEEE International Conference on Acoustics, Speech and Signal Processing, IEEE, 2021, pp. 7348-7352.
Chang, et al., "Context-aware transformer transducer for speech recognition", 2021 IEEE Automatic Speech Recognition and Understanding Workshop (ASRU), IEEE 2021, pp. 503-510.
Sathyendra, et al., "Contextual adapters for personalized speech recognition in neural transducers", ICASSP 2022-2022, IEEE, 2022, pp. 8537-8541.
Han, et al., "Improving end-to-end contextual speech recognition with fine-grained contextual knowledge selection", ICASSP 2022-2022, IEEE, 2022, pp. 8532-8536.
Munkhdalai, et al., "Fast Contextual Adaptation With Neural Associative Memory For On-Device Personalized Speech Recognition", ICASSP 2022-2022, IEEE, 2022, pp. 6632-6636.
Sahai, et al., "Dual-attention Neural Transducers for Efficient Wake Word Spotting in Speech Recognition", ICASSP 2023-2023, IEEE, 2023, pp. 1-5.
Vaswani, et al., "Attention is all you need", Advances In Neural Information Processing Systems, vol. 30, 2017.
Ouyang, et al., "Training Language Models to Follow Instructions with Human Feedback", Advances in Neural Information Processing Systems, 2022, vol. 35, pp. 27730-27744.
Radford, et al., "Language Models are Unsupervised Multitask Learners", OpenAI blog, vol. 1, No. 8, pp. 9, 2019.
Brown, et al., "Language Models Are Few-Shot Learners", NeurIPS Proceedings, vol. abs/2005.14165, 2020.
Kojima, et al., "Large Language Models are Zero-Shot Reasoners", NeurIPS Proceedings, vol. abs/2205.11916, 2022.
Panayotov, et al., "Librispeech: an ASR Corpus Based on Public Domain Audio Books", 2015 IEEE International Conference on Acoustics, Speech and Signal Processing (ICASSP), IEEE, 2015, pp. 5206-5210.
Cieri, et al., "The Fisher Corpus: A Resource for the Next Generations of Speech-to-text", in LREC, 2004, vol. 4, pp. 69-71.
Touvron, et al., "LLaMA: Open and Efficient Foundation Language Models", arXiv preprint arXiv:2302.13971, 2023.
Graves, "Sequence Transduction with Recurrent Neural Networks", 2012, arXiv preprint arXiv:1211.3711.
Fu, et al., "Robust Acoustic and Semantic Contextual Biasing in Neural Transducers for Speech Recognition", ArXiv, vol. abs/2305.05271, 2023.
Chang, et al., "Dialog ACT Guided Contextual Adapter for Personalized Speech Recognition", ICASSP, 2023.
Liebrenz, et al., "Generating Scholarly Content With ChatGPT: Ethical Challenges for Medical Publishing", The Lancet Digital Health, vol. 5, No. 3, pp. e105-e106, 2023.
Zhang, et al., "One small step for generative AI, one giant leap for AGI: A complete survey on ChatGPT in AGIC era", 2023, arXiv preprint arXiv:2304.06488.
Chan, et al., "ChatGPT Evaluation on Sentence Level Relations: A Focus on Temporal, Causal, and Discourse Relations", 2023, arXiv preprint arXiv:2304.14827.
Schick, et al., "Toolformer: Language Models Can Teach Themselves to Use Tools", Feb. 2023, arXiv:2302.04761.
Thoppilan, et al., "LaMDA: Language Models for Dialog Applications", Feb. 2022, arXiv:2201.08239.
Zhang, et al., "LLaMA-Adapter: Efficient Fine-tuning of Language Models with Zero-init Attention", Jun. 2023, arXiv:2303.16199.
Taori, et al., "Alpaca: A Strong, Replicable Instruction-Following Model", Center For Research on Foundation Models, Stanford University.
Zhang, et al., "OPT: Open Pre-trained Transformer Language Models", Jun. 2022, arXiv:2205.01068.
Prabhavalkar, et al., "End-to-End Speech Recognition: A Survey", Mar. 2023, arXiv:2303.03329v1.

* cited by examiner

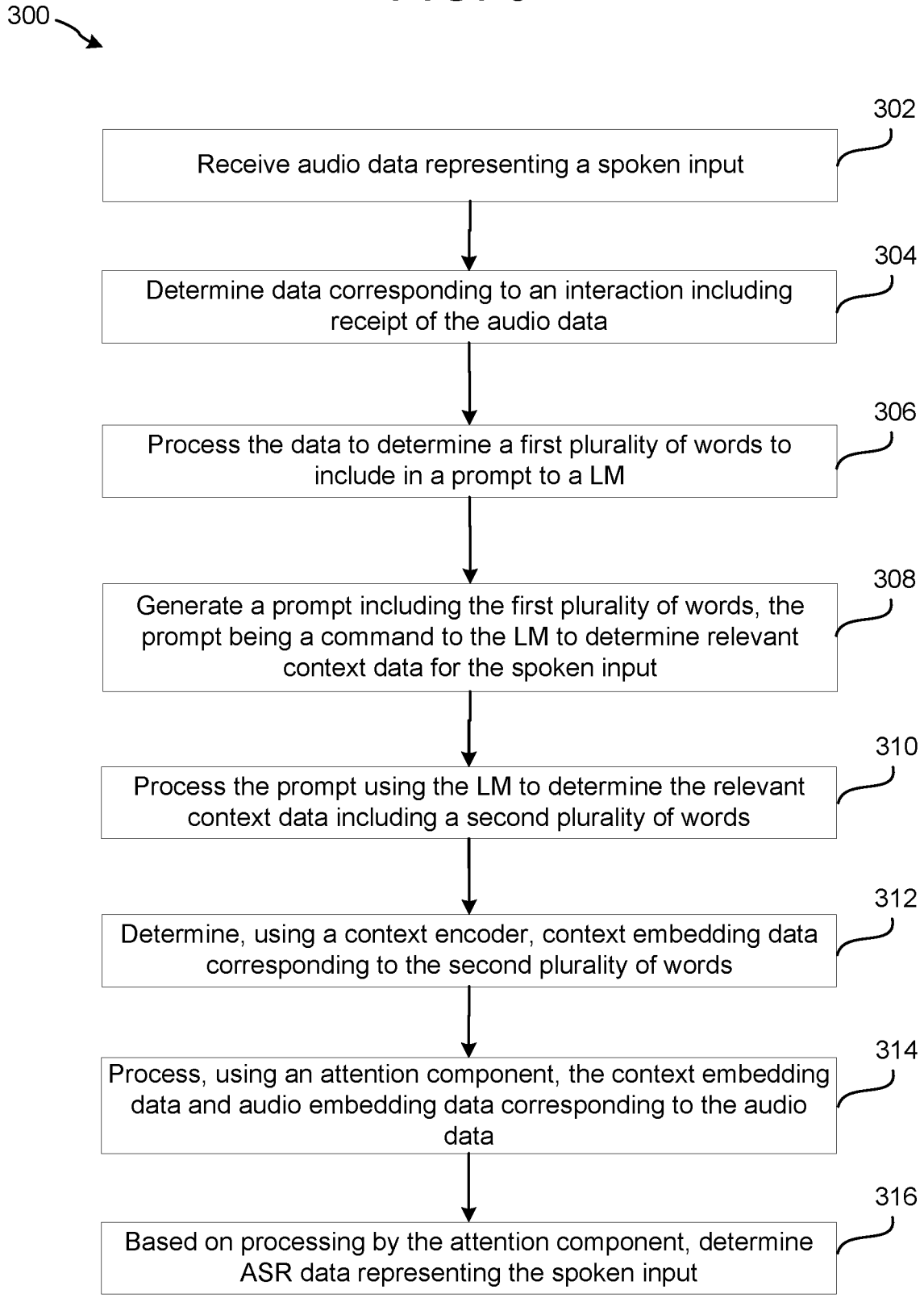

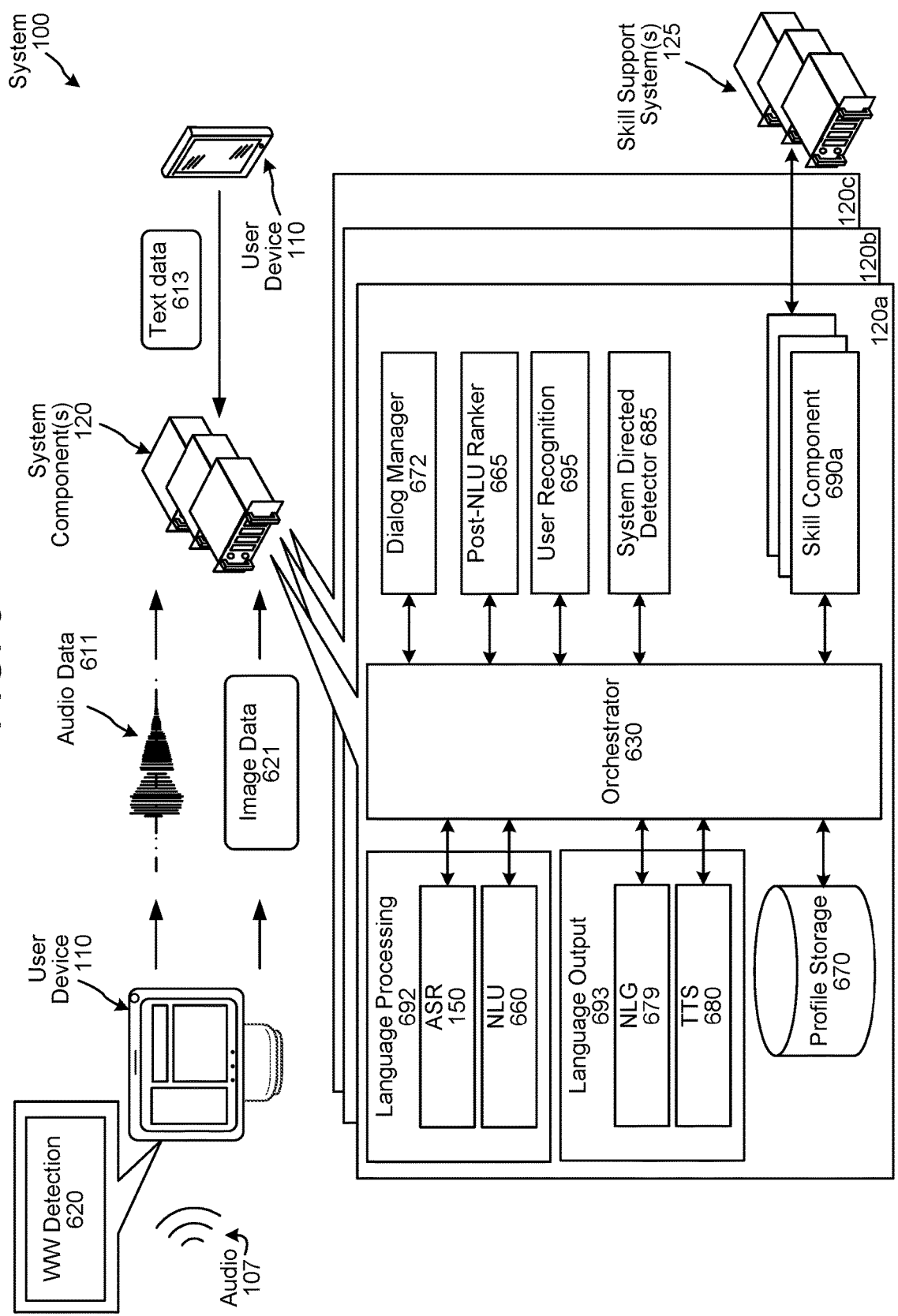

AUTOMATIC SPEECH RECOGNITION USING LANGUAGE MODEL-GENERATED CONTEXT

BACKGROUND

Spoken language understanding systems have progressed to the point where humans can interact with computing devices using their voices. Such systems employ techniques to identify the words spoken by a human user based on the various qualities of a received audio input. Speech recognition combined with natural language understanding techniques enable speech-based user control of a computing device to perform tasks based on the user's spoken commands. The combination of speech recognition and natural language understanding processing techniques is referred to herein as spoken language understanding.

Spoken language understanding may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 3 is a flowchart illustrating an example process that may be performed by the system to use LM-generated context for ASR processing, according to embodiments of the present disclosure.

FIG. 6 is a conceptual diagram of components of the system, according to embodiments of the present disclosure.

DETAILED DESCRIPTION

Figure 1:
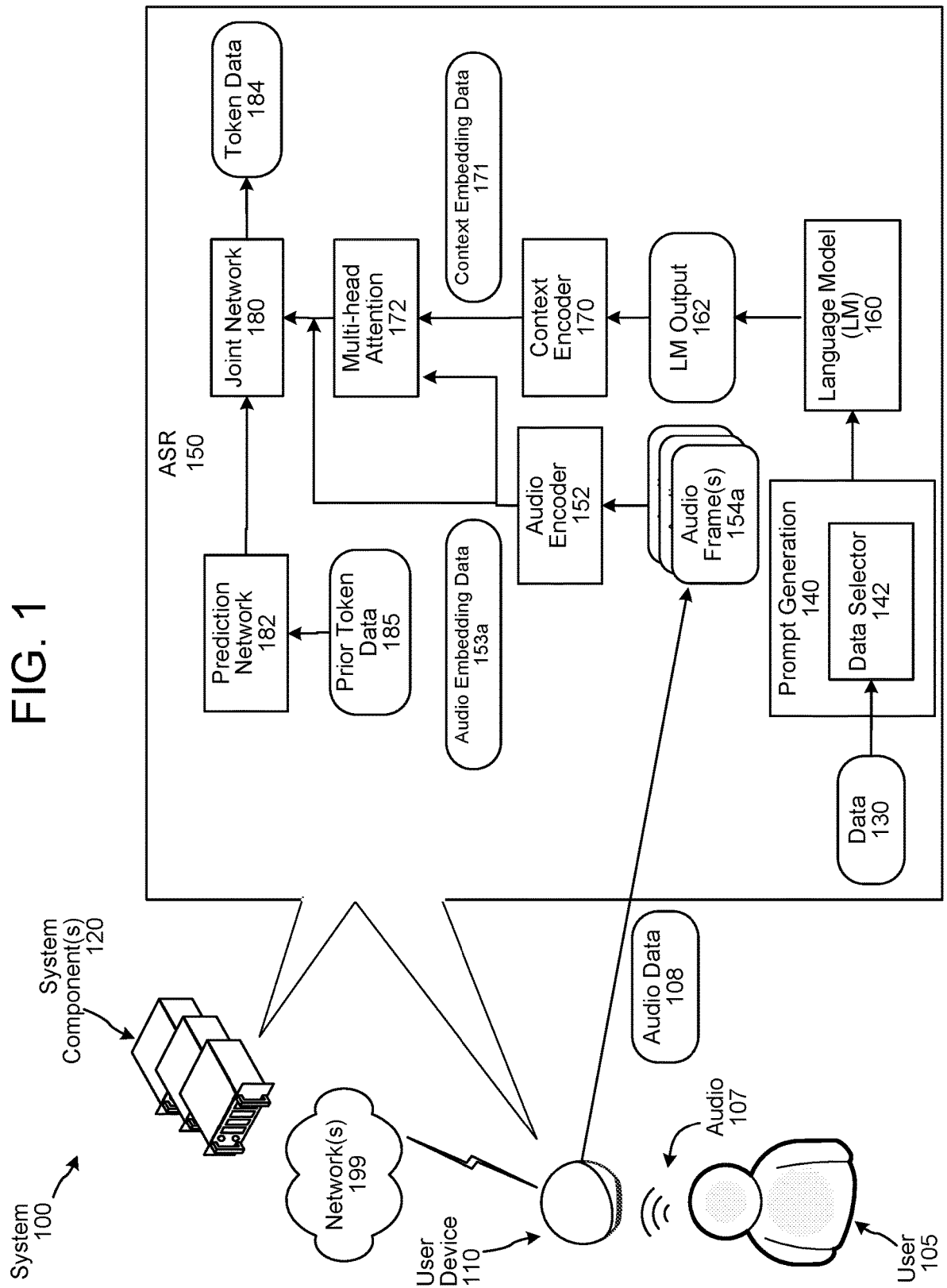
FIG. 1 illustrates a system for processing a spoken user input with an automatic speech recognition (ASR) component and a language model (LM) for context generation, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content.

Language modeling (LM) is the use of various statistical and probabilistic techniques to determine the probability of a given sequence of words occurring in a sentence. LM can be used to perform various tasks including generative tasks that involve generating data rather than discriminating between given classes. Language models analyze bodies of text data to provide a basis for their word predictions. The language models are generative models. In some embodiments, the language models may be a large language model (LLM). An LLM is an advanced artificial intelligence system designed to process, understand, and generate human-like text based on relatively large amounts of data. An LLM model may be built using deep learning techniques, such as neural networks, and may be trained on extensive datasets that include text (or other type of data) from a broad range of sources, such as old/permitted books and websites, for natural language processing. An LLM uses an expansive training dataset, as compared to a smaller language model, and can include a relatively large number of parameters (in the range of billions, trillions, or more), hence, they are called "large" language models. A system may use ASR, NLU, NLG, and/or TTS, each with and/or without a LM, for processing user inputs, including natural language inputs (e.g., typed) and spoken inputs.

Certain systems may be configured to perform actions responsive to user inputs. For example, for the user input of "Alexa, play music by [artist]," a system may output music sung by the indicated artist. For further example, for the user input of "Alexa, what is the weather in [city]," a system may output synthesized speech representing weather information for the indicated city. In a further example, for the user input of "Alexa, send a message to [recipient]," a system may capture spoken message content and cause the same to be output via a device of the indicated recipient. In yet another example, for the user input of "Alexa, set living room temperature to 70 F," a system may cause a thermostat to set to the requested temperature.

Certain speech processing systems employ techniques that process audio in a streaming manner by processing audio frames in a sequence as they are received. Such techniques may involve use of neural network-based architectures that include an audio encoder to map an acoustic input to high-level representations for decoding. In speech recognition, one technical challenge is to accurately recognize certain terms such as personalized contact names, proper nouns and trending entities/topics, etc. that may not have been included in the training data for an ASR model. For example, user inputs like "Call [contact name]" or "Turn on [device name]" may include such terms. One technique to increase recognition accuracy is to provide such terms as contextual information to the ASR model via an attention mechanism (e.g., neural biasing) so that the ASR model may recognize the term if it is included in the spoken input.

The present disclosure describes, among other things, techniques for determining contextual information for use in ASR processing, where the contextual information is determined using an LM. Given how some are trained, LMs can be capable of zero-shot sentence completion, and also of exploring temporal, causal and other relations among sentences. The present disclosure describes, among other things, use of an LM to boost an ASR model's accuracy via zero-shot biasing (e.g., without the need to re-train the ASR model). The LM's ability to capture and generate meaningful and coherent contexts that can follow the previous turns or sentences of a dialog is used to generate context for ASR processing. In some cases, the ASR model's neural transducers' hidden representation states can be enriched with the external knowledge from the LM through attention-based biasing layers.

In some embodiments, the system uses, among other things, interaction history information (e.g., past user inputs, past system actions, time/date of past interactions, visual content, context data related to the past interaction, etc.), user preference data, user profile data (e.g., personalized contacts, personalized device names, location, etc.), dialog data (e.g., past inputs of a current dialog), etc. to prompt the LM to generate words (e.g., text, tokens, etc.) that are contextually relevant for performing ASR for a future user input(s). The contextual information generated by the LM is then processed using an attention component (e.g., a multi-head attention model) to provide relevant features to the ASR model (e.g., a joiner network of the ASR model).

In some embodiments, the system can also incorporate context data not generated by the LM, for example, personalized words that may be included in user profile data. Such context data may be provided to the attention component along with the LM-generated context.

In some embodiments, the attention component may be trained to incorporate the LM-generated context, along with other context data. In other embodiments, the attention component may be pretrained and the LM-generated context may only be provided during inference time.

Techniques described herein provide various improvements and benefits. One benefit of the system is that a pre-trained/already available LM can be used along with a pre-trained/existing ASR model. That is, neither the LM nor the ASR model have to be retrained to enable use of the techniques described herein. The system effectively boosts ASR accuracy via zero-shot biasing. Additionally, the system reduces the amount of resources (e.g., computational, time, cost, etc.) used because retraining (e.g., for maintenance, initial configuration, etc.) is not necessary.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system for processing a spoken user input with an automatic speech recognition (ASR) component and a language model (LM) for context generation, according to embodiments of the present disclosure. As shown in FIG. 1, the system 100 may include a user device 110, local to a user 105, and a system component(s) 120 connected, to the user device 110, across one or more networks 199. The network(s) 199 may include the Internet and/or any other wide or local area network, and may include wired, wireless, and/or cellular network hardware. Although the figures and discussion of the present disclosure illustrate certain components and steps in a particular order, the components may be implemented in a different manner (as well as certain components removed or added) and the steps described may be performed in a different order (as well as certain steps removed or added) without departing from the present disclosure.

The system component(s) 120 may include one or more speech processing components configured to process spoken natural language inputs using ASR processing. The system component(s) 120 may also be configured to process non-spoken inputs, such as gestures, textual inputs, selection of GUI elements, selection of device buttons, etc. The system component(s) 120 may include other components to facilitate user input processing, some of which are described below in relation to FIG. 6.

In some embodiments, the user device 110 may include one or more processing components configured to process spoken natural language inputs using ASR processing. The user device 110 may include other components to facilitate user input processing, some of which are described below in relation in FIG. 7.

The user 105 may speak an input, and the user device 110 may capture audio 107 representing the utterance. The user device 110 may send audio data (e.g., audio data 108) to the system component(s) 120 for processing and/or may process the audio data 108 using the user device 110. As shown in FIG. 1, the audio data 108 may be provided to an ASR component 150. In some embodiments, the user device 110 may send the audio data 108 after the user 105 has finished speaking. In other embodiments, the user device 110 may send the audio data 108 in a streaming fashion (sending portions of the audio data 108 as it is received, as the user 105 speaks) until an endpoint of speech in the audio 107 is determined.

In some embodiments, the audio 107 may be processed using an acoustic front end (AFE) component to determine a digitized version of the audio 107. The AFE component may output the audio data 108 including one or more audio frames 154. The audio frame 154 may be a time interval for which the AFE component may determine a number of features representing qualities, characteristics, etc. of the audio, and may determine a feature vector including the features for the audio data within the frame 154. In some embodiments, the audio frames may be 10 ms each. Many different features may be determined, as known in the art, and each feature may represent some characteristic of the audio that may be useful for ASR processing. A number of approaches may be used to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The AFE component may determine the audio frame 154 as the audio 107 is made available to it. For example, the audio frame 154$a$ may be determined at a first time, an audio frame 154$b$ may be determined at a second time after the first time, an audio frame 154$c$ may be determined at a third time after the second time, and so on. The audio data 108, as used herein, may refer to audio frames of the entire audio signal representing the entire spoken input.

The ASR component 150 may process the individual audio frames 154, as they are available, using an audio encoder 152. The ASR component 150 may further include a joint network 180, a prediction network 182 and a multi-head attention component 172.

In some embodiments, the ASR component 150 may also include an LM 160, a prompt generation component 140 and a context encoder 170. In other embodiments, the LM 160, the prompt generation component 140 and the context encoder 170 may be implemented separately from the ASR component 150. In some embodiments, the prompt generation component 140 and the LM 160 may be implemented at the system component(s) 120 while the ASR component 150 including the other components (e.g., the audio encoder 152, the joint network 180, the prediction network 182, the multi-head attention component 172, the context encoder 170) may be implemented at the user device 110. In example embodiments, the system component(s) 120 may send the context data generated by the LM 160 (e.g., a LM output 162) to the ASR component 150, which may be on the user device 110 or the system component(s) 120.

The example ASR component 150, shown in FIG. 1, utilizes the LM 160 to generate context data for speech recognition. The LM 160 is prompted with dialog context, previous user inputs, etc. to predict the most probable content that can contextualize ASR processing of future user inputs. The context data is then fed to the multi-head attention component 172 to boost ASR accuracy.

In some embodiments, the ASR component 150 implements a neural-network based model/architecture, for example, a neural transducer model, a RNN-T model, etc. Such a neural-network based model may include the audio encoder 152, the prediction network 182 and the joint network 180. The audio encoder 152 may process a sequence of T feature frame vectors $(x_1, \ldots, x_T)$ extracted from the audio frame 154 and may generate high-level acoustic representations (e.g., audio embedding data 153a) $h_t$ for an individual audio frame 154. The prediction network 182 may operate autoregressively over one or more previously predicted token data 185 including a sequence of U token labels $(y_1, \ldots, y_U)$ to generate encoded prior token(s) $p_u$. As such, $h_t$=encoder($x_t$), and $p_u$=predictor($y_{u-1}$)

The joint network 180 may combine the outputs from the audio encoder 152 and the prediction network 182 to determine a likelihood for the next token data 184. The joint network 180 may be followed by a dense layer(s) and a softmax layer(s) to obtain the probability distribution over the predicted tokens. In some cases, the token data 184 may be the probability distribution over the various predicted tokens. In other cases, the token data 184 may be the top-scored/probability token(s). The prior token data 185 may be token data outputted by the joint network 180 for one or more prior audio frames of the audio data 108.

In some embodiments, the multi-head attention component 172 may include a machine learning model, such as a neural network/one or more neural layers configured to perform neural biasing. The multi-head attention component 172 may measure the similarity of audio embedding data 153 (generated by the audio encoder 152) with the context embedding data 171 (generated by the context encoder 170), and may bias (e.g., assign a weight value to) acoustic features that are similar to a word represented in the context embedding data 171 and may also bias (e.g., assign a weight value to) the lexical features representing the similar word. The multi-head attention component 172 can boost the accuracy of personalized entity-names, such as contact names, by producing higher attention weights to more relevant words.

The multi-head attention component 172 may perform audio-text cross attention. Let $C = O \cup P_{LLM}$, where O represents context data generated by the LM 160 and $P_{LLM}$ is the prompt (e.g., prompt 230 shown in FIG. 2). For each audio frame 154, based on the user input q, the multi-head attention component 172 applies cross-attention based biasing layers to attend over $C^e$, which is the embeddings of LM generated context C produced by the context encoder 170. The input q and context embeddings $C^e$ are projected by $W^q$ and $W^k$ to dimension d. The attention weight $a_i$ for each contextual entity embedding $C^e$ is calculated via the scaled dot product attention, which is mathematically expressed as:

$C^e$=ContextEncoder(C), $$\alpha_i = Softmax_i\left(\frac{W^k C^e \cdot W^q q}{\sqrt{d}}\right).$$

The biasing tensor b is calculated as an $a_i$ weighted sum of the value embeddings projected via $W^v$. Namely, $$b = \sum_i \alpha_i W^v C_i^e.$$

are utilized to update the hidden representations of the pretrained neural transducer/the joint network 180. The intermediate representations may be updated via element-wise additions. The attention weights, determined by the multi-head attention component 172, may be combined with the audio embedding data 153 prior to input to the joint network 180.

The prompt generation component 140 may be configured to generate a prompt (e.g., prompt 230 shown in FIG. 2) for the LM 160. The prompt may instruct the LM 160 to determine relevant context data for speech recognition of the instant spoken input or the instant audio frame 154a, where the prompt may include certain information that can enable the LM 160 to determine the context data. In some embodiments, the prompt generation component 140 may process data 130 using a data selector component 142. The data 130 may include data based on the instant interaction that includes receiving the audio 107 representing the spoken input from the user 105. In some embodiments, the data 130 may include user interaction history data, user preferences, dialog data, etc. In other embodiments, the data 130 may include other types of data (e.g., user context data, device context data, environmental context data, etc.) The data selector component 142 may be configured to determine prompt information based on the data 130. For example, the data selector component 142 may include a portion of the data 130 (e.g., rare/unique words found in the data 130, the five most recent past user inputs, etc.), may determine other data derived from the data 130 (e.g., a dialog topic determined using the dialog data), and the like. Further details on prompt generation/engineering are described below in relation to FIG. 2.

The LM 160 may process the prompt to generate LM output 162 including relevant context data for speech recognition. The LM output 162 may include one or more words (tokens). The LM output 162 may be processed by the context encoder 170 to generate context embedding data 171, which may be used by the multi-head attention component 172 along with the audio embedding data for attention application as described herein. In some embodiments, the LM 160 may be a GPT model (e.g., GPT-2), LLAMA Chat model, Alexa generative model(s), etc.

Figure 2:
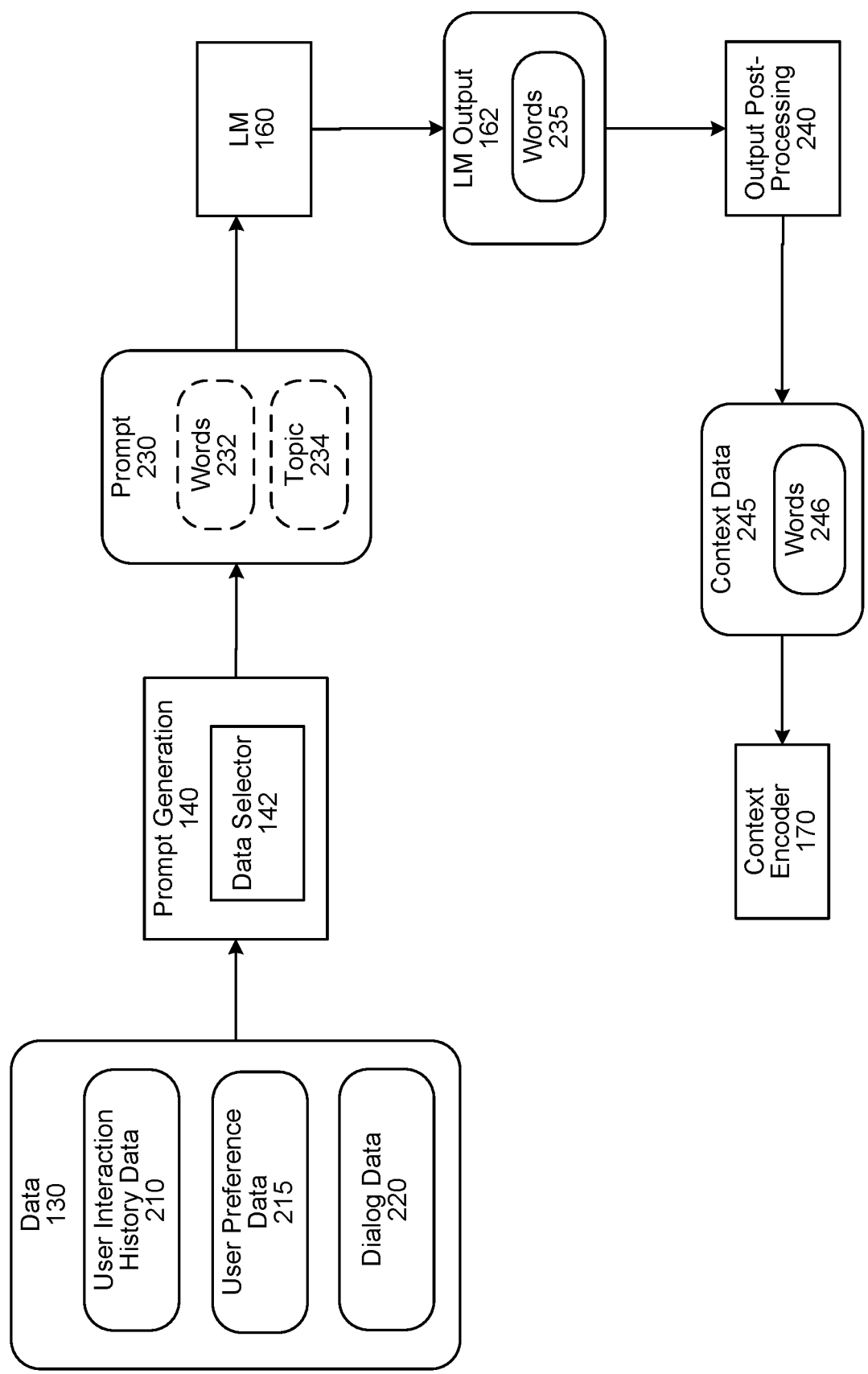
FIG. 2 is a conceptual diagram illustrating example components for determining context data, according to embodiments of the present disclosure.

FIG. 2 is a conceptual diagram illustrating example components for determining context data, according to embodiments of the present disclosure. In some embodiments, the data 130 may include user interaction history data 210, user preference data 215 and dialog data 220.

The user interaction history data 210 may include data relating to one or more past interactions between the user 105 and the user device 110/the system component(s) 120. Such data may represent past user inputs and corresponding system responses, both of which may be represented as text data, tokens, or other lexical-representative data. For example, the past user input may be "Find a [cuisine] restaurant" and the system response may be "Here is [restaurant name] located at [address]". The past user input may be a natural language input (e.g., typed or spoken), a gesture input, a selection of a physical button of the device 110, a selection of a GUI element on a display of the device 110, etc. The user interaction history data 210 may include a text/token representation of the past user input (e.g., for a gesture input of shaking head the past user input may be "shaking head" or [gesture="no"]). The system response may be an output including natural language data which may be presented to the user 105 as synthesized speech (using a TTS component 680), displayed text, image, etc., via a notification or other type of output. The system response may instead or additionally be performance of an action (e.g., updating a device state, setting a timer/alarm, adding an item to a list, etc.), in which case the performed action may be represented as text/tokens (e.g., turn on TV, set temperature to 70° F., set timer for 1 minute, etc.).

The user interaction history data 210 may also include context data related to the past interactions, for example, user context (e.g., user location, user profile identifier, user demographics, user profile data, user preferences, personalized catalogs, enabled skills/applications, etc.), device context (e.g., device type, device identifier, device location (e.g., living room, kitchen, office, etc.), device capabilities, device state, etc.), environmental context (e.g., time/date the past user input was received/processed, device that received the user input, device that responded to the user input, objects proximate to the device/user, background audio/noises, state/status of device(s) in the user's environment (e.g., TV is on, thermostat temperature, etc.), and the like.

The user interaction history data 210 may also include visual content and/or audio content that may be outputted by the user device 110 while the past user input is received and/or the past system response is presented. For example, a display 816 of the user device 110 may display images/graphics representing media titles while the user provides an input or as the system responds to a user input. As another example, the user device 110 may play audio (e.g., a song, an advertisement, a podcast, etc.) while the user provides an input or as the system responds to a user input. The user interaction history data 210 may include a text/token representation of the visual content and the audio content. For example, the user interaction history data 210 may include text representing the media titles being displayed, text representing the song being played, etc.

In some cases, the user interaction history data 210 may include data relating to past interactions of another user, for example, a user(s) of the same household as the user 105. In some cases, the user interaction history data 210 may include data relating to past interactions with another user device, for example, a user device(s) associated with a profile of the user 105.

The user interaction history data 210 may include data relating to user inputs that may not be part of a dialog session or that may be part of a past dialog session and not part of a current dialog session that the audio 107 is associated with. The dialog data 220, described below, may represent data of the current dialog session.

The user preference data 215 may include data representing a preference(s) of the user 105, which may be stored in user profile storage 670 (shown in FIG. 6). The user preference data 215 may represent preferences specifically indicated by the user 105 or implicitly derived by the system based on past user interactions. For example, the user 105 may indicate a first music skill component 690 as a preferred skill to play music; such indication may be stored in the user profile storage 670. As another example, the user 105 may frequently select the first music skill component 690 when playing music and the system may infer a preference for the first music skill component 690 (over other music skill components). In addition to skill preferences, the user preference data 215 may indicate media genre preferences (e.g., rock music, comedy movies, etc.), artist preferences, actor preferences, cuisine preferences, location preferences, event preferences (e.g., concert events, sporting events, etc.), sporting team preferences, topics of interest, domain preferences, etc. The preferences may be represented as text/tokens in the user preference data 215.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

As used herein, a "dialog," "dialog session," "session," or the like refers to various related user inputs and system responses, for example inputs and outputs related to an ongoing exchange between a user and the system.

A dialog may be goal-oriented, meaning the dialog is directed to the system performing a specific action requested by a user (such as figuring out what music the system should play). Alternatively, a dialog may not be goal-oriented, for example as part of a freeform conversation between the system and a user that may not have a definite end point or action in mind at the end of the conversation. For example, a user may ask a system "Alexa, tell me something interesting" or "Alexa, let's have a conversation." System components that control what actions the system takes in response to various user inputs of a dialog may sometimes be referred to as chatbots.

A user input and performance by the system of a corresponding action responsive to the user input, may be referred to as a dialog "turn." A dialog session identifier may be associated with multiple related turns corresponding to consecutive related user inputs. One user input may be considered related to a subsequent user input, thereby causing a single dialog session identifier to be associated with both user inputs, based on, for example, a length of time between receipt of the first user input and receipt of the subsequent user input, a length of time between performance of an action responsive to the first user input and receipt of the subsequent user input, and/or the substance of the user input or the system response.

The system(s) 100 may include a dialog manager component 672 (shown in FIG. 6) that manages and/or tracks a dialog between a user and a device. Further details of the dialog manager component 672 are descried below in relation to FIG. 6. The dialog data 220 may be provided by the dialog manager component 672 in some embodiments.

The dialog data 220 may include dialog history for the current dialog session. When the audio 107 is received, the system may associate a dialog session identifier with it and data determined based on processing the audio 107. Subsequently received or previously received spoken inputs (or other type of user inputs) that may be part of the same dialog may be associated with the same dialog session identifier. The dialog data 220 may include data representing previous user input(s) of the current dialog, system response(s) to the previous user input(s), and other related data. The previous user inputs may be represented in a similar manner as the past user inputs of the user interaction history data 210, and the system responses may be represented in a similar manner as the past system responses of the user interaction history data 210, described above. The data related to the dialog session may include context data similar to the context data described above in relation to user interaction history data 210 (e.g., user context, device context, environment context, etc.). In examples, the dialog data 220 may include visual context data representing an item(s)/data being displayed via the user device 110 during the dialog session. For example, the dialog data 220 may include media items, products, search results, weather, navigation directions, etc. displayed via the user device 110 while the user 105 is providing user inputs of the dialog. The visual context data may be included in image data 621 (shown in FIG. 6).

In some embodiments, the dialog data 220 may include a dialog summary generated using the dialog history (e.g., by the dialog manager component 672). The dialog summary may include a representation of the prior user inputs and corresponding system responses, where the representation may be a summarized version. For example, a dialog history may include a user input: "Find [cuisine] restaurants", system response: "Here are restaurants near you: [list of restaurants]", user input: "I want to order food from [first restaurant]", system response: "[First restaurant] has online ordering, ordering via phone, take-out and delivery. How would you like to order?", user input: "Online order for delivery." For this example dialog history, the dialog summary may be: "User searched for [cuisine] restaurants and ordered delivery online from [first restaurant]."

In some embodiments, the data 130 may include one or more of the user interaction history data 210, the user preference data 215 and the dialog data 220. In other words, all three instances of the data illustrated in FIG. 2 may be provided to the prompt generation component 140 for processing a spoken input. The data 130 may include other data depending on system configurations.

The prompt generation component 140 may process the data 130 to generate the prompt 230 including words 232 and/or topic 234. The prompt generation component 140 may include the data selector component 142 in some embodiments. The prompt 230 may include a certain number of tokens/words. If the prompt 230 includes too much information, it may affect the accuracy or ability of the LM 160 to identify relevant context data. In some examples, the prompt 230 may be limited to 250 words, 500 words, etc.

In example embodiments, the data selector component 142 may determine rare and/or unique words from the data 130, which may be included in the prompt 230 as the words 232. For example, the data selector component 142 may be configured to filter certain words from the data 130 that may be common words, words that the ASR component 150 is capable of recognizing with a high level of confidence, etc. In some embodiments, the data selector component 142 may be configured to filter out non-noun words, like verbs, adjectives, adverbs, articles, pronouns, etc. In some embodiments, the data selector component 142 may be configured to keep words representing entities (e.g., a place, a person, a thing, etc.) and to remove/filter out words not representing an entity. For example, words like "play", "the", "music", "John", etc. may be filtered out from the data 130. From the resulting filtered data, the data selector component 142 may identify unique words (e.g., remove repeated/duplicate words). From the resulting unique set of words, in some embodiments, the data selector component 142 may further determine rare or uncommon words, which may be included as the words 232 in the prompt 230. Rare, uncommon or unique words may be words that are rare, uncommon or unique in the language of the spoken input (e.g., rare, uncommon or unique words in English), may be words that are not included in the training data of the ASR component 150 (e.g., rare, uncommon or unique for the ASR component 150), etc. A word can appear more than once (e.g., frequently) within the data 130 and may still be a rare, uncommon or unique word with respect to the language (e.g., English) and/or the training data. In some examples, a word that appears infrequently in the data 130 may be considered a rare, uncommon or unique word.

In some embodiments, the data selector component 142 may using ranking techniques to determine which words from the data 230 are to be included in the prompt 230. The ranking techniques may use factors such as recency of the words (e.g., words from the dialog data 220 representing the current dialog session may be ranked higher than words from a past user interaction that may have occurred a day prior), user preferences, frequency of the words in the data 130 (e.g., words that appear frequently in the data 130 may be ranked higher than words that appears once), etc.

In some embodiments, the data selector component 142 may be configured to determine a topic 234 from the data 130, in particular the dialog data 220. For example, the data selector component 142 may determine one or more topics of the current dialog session (e.g., restaurant search, [cuisine type], food delivery, etc. may be topics of the same dialog session). The data selector component 142 may use a topic classification model(s) to determine the topic 234.

The prompt generation component 140 may generate the prompt 230 to include the words 232 and/or the topic 234. The prompt 230 may also include other information, such as an command to determine relevant context for a future/subsequent user input. The prompt 230 may be natural language data and may include text or tokens. For example, the prompt 230 may be: "Which of the following words are relevant for the subsequent user input: [list of words]." As another example, the prompt 230 may be: "Which words are likely to be included in the next user input: [list of words]." Yet another example of the prompt 230 is "Tell me which words are relevant for recognizing the next user input given the topic: [topic] and relevant words: [list of words]."

The LM 160 may process the prompt 230 and generate the LM output 162 which may include words 235. Based on the prompt 230 instructing the LM 160 to determine relevant words/context data, the LM output 162 may include the words 235 determined by the LM 160 as being relevant. The LM 160 may determine the words 235 as being relevant for performing speech recognition for the current user input (i.e. the audio 107). In other words, the LM 160 may determine/ predict, based on the information in the prompt 230, a subsequent/future user input or the words 235 that may be included in the subsequent user input. For example, given the words 232 and/or topic 234, the LM 160 may predict words likely to be included in a user input, which can be based on a dialog topic, the rare/unique words, etc.

In some cases, the words 235 may be include one or more of the words 232 (i.e., the words 235 may be a portion of/subset of the words 232). That is, the LM 160 may select from the words 232 the words 235 as being relevant for performing speech recognition for the next user input. In other cases, the words 235 may include one or more words that are different than the words 232. In some cases, the words 235 may correspond to the topic 234. For example, if the topic 234 is "medical information", "cold remedies", etc., the words 235 may be words related to medical information (e.g., "symptoms", "over the counter medication", "medical professional", etc.) and/or words related to cold remedies (e.g., "home remedy", "over the counter", "congestion", popular brand names for over the counter medications, etc.).

In some embodiments, an output post-processing component 240 may process the LM output 162. The output post-processing component 240 may be configured to process the words 235 to determine context data 245, which may include words 246. The output post-processing component 240 may be configured to perform data deduplication on the words 235 to remove any repeated/duplicated words to determine the context data 245. The output post-processing component 240 may additionally or alternatively be configured to remove non-noun words, like verbs, adjectives, adverbs, pronouns, articles, etc. to determine the context data 245. In some embodiments, the output post-processing component 240 may employ a bag-of-words model to process the words 235 to determine the context data 245. In some embodiments, the output post-processing component 240 may employ a rules-engine, text parsing techniques, word tagging techniques, etc. The words 246, included in the context data 245, may be a portion of/subset of the words 235.

The context data 245 may be processed using the context encoder 170 to determine the context embedding data 171, which may be processed using the multi-head attention component 172 along with the audio embedding data 153 from the audio encoder 152.

Some embodiments involve prompt generation/engineering using the prompt generation component 140. The prompt generation component 140, along with the data selector 142, is used to generate prompts 230 to ground the most relevant knowledge from the LM 160 under a given context. Let $R_n$ denote a collection of n rare words for a given corpus. Let $H_k$ be the past k tokens emitted from the ASR component 150. Let $P_{LM}$ be the input prompts for the LM 160, and O be the predicted future tokens by determined by the LM 160. In some embodiments, the prompt 230 may include previously emitted tokens—namely $P_{LM}=H_k$. Such a prompt may enable the LM 160 to comprehend and generate the LM output 162 based on the preceding context, enriching the contextual information for ASR prediction. In other embodiments, the prompt 230 may include certain rare words and previously emitted tokens—namely, $P_{LM}=R_n \cup H_k$. Such a prompt may encourage the LM 160 to give special attention to infrequent words, enhancing the ASR model's ability to recognize less common words given contexts.

Contextual information, the LM output 162, generated by the LM 160, which may be prompted with the data 130 (e.g., user preference, interaction history and previous turns), may flow back into the transducer layers of the ASR component 150 to augment the hidden representation for the neural transducer encoder (e.g., the audio embedding data 153 generated by the audio encoder 152). To reduce compute costs, in some embodiments, the LM weights are frozen. The ASR model layers (e.g., the audio encoder 152, the joint network 180, the prediction network 182) may be trained until the model converges and achieves good accuracy. Then the LM 160 may be prompted and only the neural biasing layers (e.g., the multi-head attention component 172 and the context encoder 170) may be fine-tuned while keeping the weights frozen for neural transducers (e.g., the audio embedding data 153 generated by the audio encoder 152).

In some embodiments, the LM output 162 may be determined at beginning of processing of the spoken input/the audio data 108 (e.g., when a first audio frame 154a is processed), and the corresponding context embedding data 171 may be stored/cached. The prompt 230 may be determined when or in parallel of determining the audio frame 154a. The stored context embedding data 171 may be used by the multi-head attention component 172 when processing subsequent audio frames 154 of the audio data 108. While audio frames 154 of the audio data 108 are being processed, the LM 160 may be prompted to determine updated LM output 162 based on updated context data/data 130. For example, if the visual context data representing item(s)/data displayed via the user device 110 (e.g., on-screen context) is updated (e.g., the user selects a displayed item), then the LM 160 may be prompted to determine updated LM output 162 based on the updated visual context data, which may be represented in the data 130. In some cases, the data 130 may include the updated visual context data along with the initial data that was included in the prior prompt. In other cases, the prompt 230 may only include the updated visual context data.

In some embodiments, as audio frames 154 of the audio data 108 are processed by the ASR component 150, the context encoder 170 (instead of the LM 160) may be provided updated context data when context data is updated during processing of the spoken input. For example, if the visual context data representing item(s)/data displayed via the user device 110 (e.g., on-screen context) is updated (e.g., the user selects a displayed item), then the updated visual context data may be provided to the context encoder 170, which may determine updated context embedding data for the multi-head attention component 172 to use in addition to (or instead of) the stored/cached context embedding data 171.

FIG. 3 is a flowchart illustrating an example process 300 that may be performed by the system to use LM-generated context for ASR processing, according to embodiments of the present disclosure. At a step 302, of the process 300, the ASR component 150 may receive the audio data 108 representing a spoken input. At a step 304, of the process 300, the system may determine the data 130 corresponding to an interaction including receipt of the audio data 108. As described herein, in some cases, the spoken input represented in the audio data 108 may be part of an on-going dialog session, in which case the data 130 may at least include the dialog data 220 (and may also include user interaction history data 210, user preference data 215, etc.). In other cases, the spoken input represented in the audio data 108 may be a first turn of a dialog or may not be part of a dialog (i.e., may not follow any prior user inputs or may not be followed by any future user inputs that are part of a dialog session). In such cases, the data 130 may include user interaction history data 210 and user preference data 215

(and may not include dialog data 220). At a step 306, of the process 300, the prompt generation component 140 may process the data 130 to determine a first plurality of words to include in the prompt 230. As described herein, the prompt generation component 140 may include the data selector component 142 that may process the data 130 to determine rare, uncommon or unique words. At a step 308, of the process 300, the prompt generation component 140 may generate the prompt 230 including the first plurality of words (e.g., the words 232), which may be the rare, uncommon and unique words determined by the data selector component 142. The prompt 230 may also include an command to the LM 160 to determine relevant context data for the spoken input (e.g., context data relevant for performing ASR for the audio data 108).

At a step 310, of the process 300, the LM 160 may process the prompt to determine the relevant context data, for example, the LM output 162, including a second plurality of words, for example, the words 235. The LM output 162 may include the words 235 that may be relevant for recognizing the words in the spoken input. The LM 160 may predict the words 235 as being the likely words to be included in the spoken input. In some cases, the LM 160 may predict the words 235 based on the user interaction history data 210, the user preference data 215 and/or the dialog data 220. For example, based on the user interaction history data 210 including a particular location name, the LM 160 may include that location name in the words 235. As another example, based on the user preference data 215 including a particular artist name, the LM 160 may include that artist name in the words 235. As yet another example, based on the dialog data 220 including a particular restaurant name, the LM 160 may include that restaurant name in the words 235.

At a step 312, of the process 300, the context encoder 170 may determine context embedding data 171 corresponding to the second plurality of words 235. In some embodiments, the LM output 162 may be processed further (e.g., to determine the context data 245) prior to determining the context embedding data 171. At a step 314, of the process 300, the multi-head attention component 172 may process the context embedding data 171 and audio embedding data 153 corresponding to the audio data 108. As described above in relation to FIG. 1, the audio data 108 may be divided into multiple audio frames 154, and in some cases, the audio embedding data 153a may be determined by the audio encoder 152 using the audio frames 154a. At a step 316, of the process 300, the ASR component 150 may determine, based on the processing by the multi-head attention component 172, ASR data representing the spoken input (e.g., the token data 184, the prior token data 185, etc.).

Figure 4:
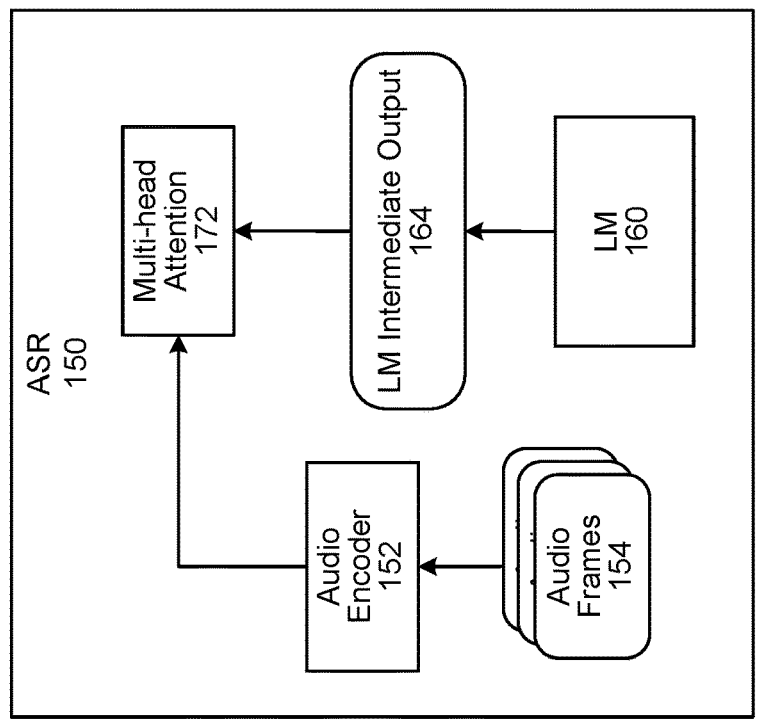
FIG. 4 is conceptual diagram illustrating an example of how context data generated by the LM may be incorporated in the ASR component, according to embodiments of the present disclosure.

FIG. 4 is conceptual diagram illustrating an example of how context data generated by the LM is incorporated in the ASR component 150, according to embodiments of the present disclosure. In some embodiments, embedding data from an intermediate layer/portion of the LM 160 may be used as context data for ASR processing. Such embedding data may be processed directly by the multi-head attention component 172. As shown in FIG. 4, an LM intermediate output 164 may be determined from the LM 160, where the LM 160 may process the prompt 230 (described above) including the words 232 or topic 234 and an command to determine relevant context data to perform ASR processing for the audio data 108. Based on processing the prompt 230, the LM 160 may determine the LM intermediate output 164. The LM intermediate output 164 may be extracted from an intermediate layer/portion of the LM 160 that may be a non-final layer of the LM 160. Whereas the LM output 162 (described above) may be the output of the final layer of the LM 160. Since the LM intermediate output 164 may be generated by an intermediate layer of the LM 160, the LM intermediate output 164 may be embedding data corresponding to the LM output 162/the words 235. As such, the LM intermediate output 164 may be processed directly by the multi-head attention component 172. In comparison, the LM output 162 may be processed by the context encoder 170 to determine context embedding data 171 that is then processed by the multi-head attention component 172. In the example embodiment shown in FIG. 4, the multi-head attention component 172 may process the audio embedding data 153a corresponding to the audio frame 154a and the LM intermediate output 164, and the output of the multi-head attention component 172 may be processed in a similar manner by the joint network 180 as described herein.

Figure 5:
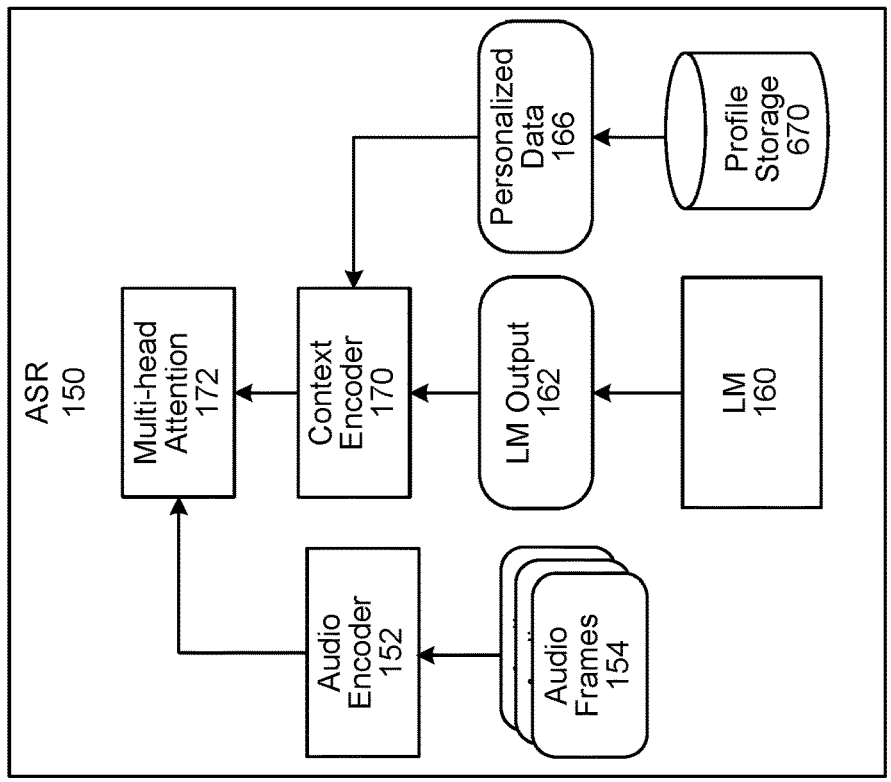
FIG. 5 is a conceptual diagram illustrating an example of how additional context data may be incorporated in the ASR component, according to embodiments of the present disclosure.

FIG. 5 is a conceptual diagram illustrating an example of how additional context data may be incorporated in the ASR component 150, according to embodiments of the present disclosure. In some embodiments, additional context data, such as personalized data 166, may be used to perform ASR. The personalized data 166 may be stored in a profile storage 670 associated with a user profile of the user 105. The personalized data 166 may include words representing various user-specific/personalized information, such as the user's contacts name list/address book, a playlist name(s) created by the user (e.g., "my workout playlist", "evening playlist", etc.), a device name(s) provided by the user (e.g., "upstairs hallway lights", "basement speakers", "outdoor TV", etc.), a shopping list name(s), a task name(s), a routine name(s) created by the user (e.g., a routine being one or more actions to be performed when a trigger occurs), and the like. As shown in FIG. 5, the personalized data 166 may be processed using the context encoder 170 to generate corresponding personalized embedding data. The LM output 162 may also be processed using the context encoder 170 to generate the context embedding data 171, as described herein. The personalized embedding data and the context embedding data 171 may be processed using the multi-head attention component 172 along with the audio embedding data 153 corresponding to the audio frame 154, as described herein. Processing the personalized data 166 as a separate input, instead of inputting the personalized data 166 to the LM 160 (to enable the LM 160 to select relevant context from the personalized data 166), can help reduce the amount of information included in the prompt 230, which can have a limited-capacity/size.

In this manner, context data in addition to the LM-generated context data may be used for ASR processing.

Other types of data may be used as context data for ASR processing. Context data corresponding to a new domain or an updated domain may be used. The ASR component 150 may not have been retrained/updated to recognize words corresponding to the new or updated domain, and the context data may include such words so that via neural biasing performed using the multi-head attention component 172, ASR can accurately recognize the new words. For example, a music domain may be updated to respond to requests related to recently released albums, the context data may include words related to the albums (e.g., album names, artist names, song names, etc.), and such context data may be used to perform neural biasing. As another example, the system may be updated to respond to requests relating to new domain, for example, "image domain", the context data may include words related to images (e.g., commands supported by the image domain, like "generate an image", "edit an image", etc., commands to edit an image, like "crop image", "rotate", "black white filter", etc., and the like), and such context data may be used to perform neural biasing so that ASR can recognize the words for the new domain.

The other types of context data (e.g., corresponding to new or updated domains) may be incorporated via the LM 160. That is, the data 130 may include the context data, the prompt generation component 140 may include the rare, uncommon or unique words in the prompt 230, and the LM 160 may determine whether any of those words are relevant for performing ASR for the audio data 108. In other embodiments, the other types of context data (e.g., corresponding to new or updated domains) may be incorporated in a similar manner as the personalized data 166 shown in FIG. 5.

In some embodiments, the personalized data 166 and/or other types of context data (e.g., corresponding to new or updated domains) may be incorporated into the context data 245 (shown in FIG. 2) by the output post-processing component 240. For example, the output post-processing component 240 may determine one or more words from the personalized data 166 and/or other types of context data and may include such determined word(s) in the words 246 along with the words 235 generated by the LM 160. The output post-processing component 240 may filter out duplicate words, non-noun words, common words, etc. to determine the context data 245.

Techniques described herein can be used to generate context data for other types of processing. For example, the LM 160 may be used to generate context data for spoken language understanding (SLU) processing. SLU processing involves determining an intent or requested action from audio data representing a spoken input. The LM-generated context data can be used to inform SLU processing of words that are likely to be included in the spoken input.

In some embodiments, the system 100 may include other types of generative models, for example, an audio-to-text generative model, an image-to-text generative model, a multi-modal generative model, etc. Such generative models may process context data, provided in various forms (e.g., audio, image, text), and determine relevant context data for the ASR component 150 (or other system component(s) 120). For example, the image-to-text model or multi-modal generative model may process the image data 621 representing visual context data (e.g., on-screen context) to determine one or more words relevant for transcribing the spoken input included in the audio 107.

In some embodiments, the LM 160 may be a transformer-based seq2seq model involving an encoder-decoder architecture. In an encoder-decoder architecture, the encoder may produce a representation of an input text using a bidirectional encoding, and the decoder may use that representation to perform some task. In some such embodiments, the LM 160 may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the LM 160 may be pre-trained for approximately 1 trillion tokens. Being trained on CLM tasks, the LM 160 may be capable of in-context learning. An example of such a LM is Alexa generative model. In other embodiments, the LM 160 may be a decoder-only architecture. The decoder-only architecture may use left-to-right (unidirectional) encoding of the input text. An example of such a LM is the Generative Pre-trained Transformer 3 (GPT-3) and other versions of GPT. GPT-3 has a capacity of (approximately) 175 billion machine learning parameters. Other examples of LMs include BigScience Large Open-science Open-access Multilingual Language Model (BLOOM), Language Model for Dialogue Applications model (LaMDA), Bard, Large Language Model Meta AI (LLaMA), etc.

Techniques of the present disclosure may use other types of generative models, including text-to-image generative models, text-to-audio generative models, image-to-text generative models, audio-to-text generative models, image-to-image generative models, audio-to-audio generative models, etc.

In some embodiments, the system may include a machine learning model(s) other than a LM or in addition to a LM. Such machine learning model(s) may receive text and/or other types of data as inputs, and may output text and/or other types of data (e.g., context data relevant for performing ASR processing). Such model(s) may be neural network based models, deep learning models, classifier models, autoregressive models, seq2seq models, etc.

In embodiments the input to the LM may be in the form of a prompt. A prompt may be a natural language input, for example, a command, for the LM to generate an output according to the prompt. The output generated by the LM may be a natural language output responsive to the prompt. The prompt and the output may be text in a particular language (e.g., English, Spanish, German, etc.). For example, for an example prompt "how do I cook rice?", the LM may output a recipe (e.g., a step by step process) to cook rice. As another example, for an example prompt "I am hungry. What restaurants in the area are open?", the LM may output a list of restaurants near the user that are open at the time.

In some embodiments, the LM 160 may be fine-tuned to perform relevant context determination. Fine-tuning of the LM 160 may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, the LM 160 may be configured to use zero-shot learning. In zero-shot learning, the model is not provided any examples or labeled data to learn from. The LM 160 generates a response to the command in the prompt by adapting to unseen problems based on its initial training and knowledge obtained from the training.

In some embodiments, the LM 160 may be configured to use few-shot learning. In few-shot learning, the model learns how to learn to solve the given problem included in the prompt. In this approach, the model is provided with a limited number of examples (i.e., "few shots") from the new task, and the model uses this information to adapt and perform well on that task. Such examples may be included in the prompt.

In some embodiments, the prompt generation component 140 may be optimized to generate the prompt 230 so that the words 232 correspond to an optimized coverage rate. Coverage rate may refer to the overlap of the context generated from LM 160 with a ground truth (e.g., words that are included in the spoken input). A higher overlap between the LM-generated context and the ground truth, the better the quality of the context data. The coverage rate may be optimized by variations in the prompt 230.

One approach for optimizing, tuning and prompt engineering may involve using an genetic algorithm method. For example, in a crossover technique, two prompts are used to generate a different prompt based on some combination of the two prompts. In a mutation technique, some of the tokens in the prompt are changed. Different operations may be performed at each iteration of the genetic algorithm. After applying these operations, a fitness function may be measured with respect to the generated prompts in the population, the generated prompts may be fed to the LM, and then the coverage rate may be computed.

Genetic algorithms are a type of evolutionary algorithm inspired by the process of natural selection. They are used to solve optimization problems and search for optimal solutions in a large search space. The algorithm starts with a population of candidate solutions represented as chromosomes, and then evolves the population over generations through selection, crossover, and mutation operations. In the context of prompt tuning, prompt engineering may be treated as an optimization problem, where the objective is to find the most effective prompt that maximizes the performance of the language model on a specific task. In this case, the objective is to find the most effective prompt to maximize coverage of rare words in the next/future user input.

A representation for prompts may be defined, which could be a sequence of phrases and phrases could be selected from a predefined set. A fitness function may be created that evaluates the performance of the language model on the task using a given prompt. This would be the coverage of rare words in the next/future user input. An initial population may be generated of candidate prompts randomly or using some heuristic method. The fitness of each individual prompt in the population may be evaluated based on the fitness function, and the best-performing prompts (parents) may be selected to form the next generation. Crossover operations may be performed on the selected prompts to create new candidate prompts (children). Crossover involves combining parts of the parent prompts to generate offspring. Small random changes may be introduced to some of the candidate prompts to encourage exploration of different regions in the prompt space. The old generation may be replaced with the new generation of candidate prompts. In termination, the selection, crossover, mutation, and replacement steps may be repeated for a certain number of generations or until a convergence criterion is met. After the algorithm has terminated, the best-performing prompt may be selected based on the fitness function.

The system 100 may operate using various components as described in FIG. 6. The various components may be located on same or different physical devices. Communication between various components may occur directly or across a network(s) 199. The device 110 may include audio capture component(s), such as a microphone or array of microphones of a device 110, captures audio 107 and creates corresponding audio data. Once speech is detected in audio data representing the audio 107, the device 110 may determine if the speech is directed at the device 110/system component(s) 120. In at least some embodiments, such determination may be made using a wakeword detection component 620.

The wakeword detection component 620 may process the audio data, representing the audio 107, to determine whether speech is represented therein. The user device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection may be performed without performing linguistic analysis, textual analysis, or semantic analysis. Instead, the audio data, representing the audio 107, is analyzed to determine if specific characteristics of the audio data match preconfigured acoustic waveforms, audio signatures, or other data corresponding to a wakeword. Thus, the wakeword detection component 620 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech can include other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 620 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 620, the user device 110 may "wake" and begin transmitting audio data 611/711 (shown in FIGS. 4 and 5), representing the audio 107, to the system component(s) 120. The audio data 611 may include data corresponding to the wakeword.

The wakeword detection component 620 may be configured to detect various wakewords. In at least some examples, each wakeword may correspond to a name of a different digital assistant. An example wakeword/digital assistant name is "Alexa." In another example, input to the system may be in form of text data 613, for example as a result of a user typing an input into a user interface of device 110. Other input forms may include indication that the user has pressed a physical or virtual button on device 110, the user has made a gesture, etc. The device 110 may also capture images using camera(s) 818 of the device 110 and may send image data 621 representing those image(s) to the system component(s) 120. The image data 621 may include raw image data or image data processed by the device 110 before sending to the system component(s) 120. The image data 621 may be used in various manners by different components of the system to perform operations such as determining whether a user is directing an utterance to the system, interpreting a user command, responding to a user command, etc.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

Once the wakeword is detected by the wakeword detection component 620 and/or input is detected by an input detector, the device 110 may "wake" and begin transmitting audio data 611, representing the audio 107, to the system component(s) 120. The audio data 611 may include data corresponding to the wakeword; in other embodiments, the portion of the audio corresponding to the wakeword is removed by the device 110 prior to sending the audio data 611 to the system component(s) 120. In the case of touch input detection- or gesture-based input detection, the audio data may not include a wakeword.

In some implementations, the system 100 may include more than one system component(s) 120. The system components 120 may respond to different wakewords and/or perform different categories of tasks. Each system component(s) 120 may be associated with its own wakeword such that speaking a certain wakeword results in audio data be sent to and processed by a particular system. For example, detection of the wakeword "Alexa" by the wakeword detection component 620 may result in sending audio data to system component(s) 120a for processing while detection of the wakeword "Computer" by the wakeword detector may result in sending audio data to system component(s) 120b for processing. The system may have a separate wakeword and system for different skills/systems (e.g., "Dungeon Master" for a game play skill/system component(s) 120c) and/or such skills/systems may be coordinated by one or more skill component(s) 690 of one or more system components 120.

The system component(s) 120 may include a system directed input detector 685. In some embodiments, the user device 110 may include a system directed input detector 785 (shown in FIG. 7) that may operate in a similar manner as the system directed input detector 685. The system directed input detector 685 may be configured to determine whether an input to the system (for example speech, a gesture, etc.) is directed to the system or not directed to the system (for example directed to another user, etc.). The system directed input detector 685 may work in conjunction with the wakeword detector 620. If the system directed input detector 685 determines an input is directed to the system, the device 110 may "wake" and begin sending captured data for further processing (for example, processing audio data using the language processing 692/792, processing captured image data 621, or the like). If data is being processed the device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 685 determines an input is not directed to the system (such as a speech or gesture directed to another user) the device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 685 is determining whether an input is potentially device directed. For example, the system may output an orange indicator while considering an input, and may output a green indicator if a system directed input is detected. Other such configurations are possible.

Upon receipt by the system component(s) 120, the audio data 611 may be sent to an orchestrator component 630. The orchestrator component 630 may include memory and logic that enables the orchestrator component 630 to transmit various pieces and forms of data to various components of the system, as well as perform other operations as described herein.

The orchestrator component 630 may send the audio data 611 to a language processing component 692. The language processing component 692 (sometimes also referred to as a spoken language understanding (SLU) component) includes an automatic speech recognition (ASR) component 150 and a natural language understanding (NLU) component 660. The ASR component 150 may transcribe the audio data 611 into text data, tokenized data or other word representation data. The ASR data output by the ASR component 150 represents one or more than one (e.g., in the form of an N-best list) ASR hypotheses representing speech represented in the audio data 611.

In some embodiments, the ASR component 150 interprets the speech in the audio data 611 based on a similarity between the audio data 611 and pre-established language models. For example, the ASR component 150 may compare the audio data 611 with models for sounds (e.g., acoustic units such as phonemes, senons, phones, etc.) and sequences of sounds to identify words that match the sequence of sounds of the speech represented in the audio data 611. In some embodiments, the ASR component 150 may use one or more machine learning models, for example, neural network models, RNN models, RNN-T models, etc. The ASR component 150 sends the ASR data generated thereby to an NLU component 660, via, in some embodiments, the orchestrator component 630. The ASR data sent from the ASR component 150 to the NLU component 660 may include a single top-scoring ASR hypothesis or may include an N-best list including multiple top-scoring ASR hypotheses. An N-best list may additionally include a respective score associated with each ASR hypothesis represented therein.

The speech processing system 692 may further include a NLU component 660. The NLU component 660 may receive the ASR data from the ASR component 150. The NLU component 660 may attempts to make a semantic interpretation of the phrase(s) or statement(s) represented in the text data input therein by determining one or more meanings associated with the phrase(s) or statement(s) represented in the text data. The NLU component 660 may determine an intent representing an action that a user desires be performed and may determine information that allows a device (e.g., the device 110, the system component(s) 120, a skill component 690, a skill support system(s) 125, etc.) to execute the intent. For example, if the ASR data corresponds to "play the 5th Symphony by Beethoven," the NLU component 660 may determine an intent that the system output music and may identify "Beethoven" as an artist/composer and "5th Symphony" as the piece of music to be played. For further example, if the ASR data corresponds to "what is the weather," the NLU component 660 may determine an intent that the system output weather information associated with a geographic location of the device 110. In another example, if the text data corresponds to "turn off the lights," the NLU component 660 may determine an intent that the system turn off lights associated with the device 110 or the user 105. However, if the NLU component 660 is unable to resolve the entity—for example, because the entity is referred to by anaphora such as "this song" or "my next appointment"—the speech processing system 692 can send a decode request to another speech processing system 692 for information regarding the entity mention and/or other context related to the utterance. The speech processing system 692 may augment, correct, or base results data upon the audio data 611 as well as any data received from the other speech processing system 692.

The NLU component 660 may return NLU results data (which may include tagged text data, indicators of intent, etc.) back to the orchestrator component 630. The orchestrator component 630 may forward the NLU results data to a skill component(s) 690. If the NLU results data includes a single NLU hypothesis, the NLU component 660 and the orchestrator component 630 may direct the NLU results data to the skill component(s) 690 associated with the NLU hypothesis. If the NLU results data includes an N-best list of NLU hypotheses, the NLU component 660 and the orchestrator component 630 may direct the top scoring NLU hypothesis to a skill component(s) 690 associated with the top scoring NLU hypothesis. The system may also include a post-NLU ranker 665 which may incorporate other information to rank potential interpretations determined by the NLU component 660. The local device 110 may also include its own post-NLU ranker 765, which may operate similarly to the post-NLU ranker 665.

A skill component may be software running on the system component(s) 120 that is akin to a software application. That is, a skill component 690 may enable the system component (s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 690. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 690 may operate in conjunction between the system component(s) 120 and other devices, such as the device 110, in order to complete certain functions. Inputs to a skill component 690 may come from speech processing interactions or through other interactions or input sources. A skill component 690 may include hardware, software, firmware, or the like that may be dedicated to a particular skill component 690 or shared among different skill components 690.

A skill support system(s) 125 may communicate with a skill component(s) 690 within the system component(s) 120 and/or directly with the orchestrator component 630 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system component(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 690 dedicated to interacting with the skill support system(s) 125. Unless expressly stated otherwise, reference to a skill, skill device, or skill component may include a skill component 690 operated by the system component(s) 120 and/or skill operated by the skill support system(s) 125. Moreover, the functionality described herein as a skill or skill may be referred to using many different terms, such as an action, bot, app, or the like. The skill 690 and or skill support system(s) 125 may return output data to the orchestrator component 630.

The post-NLU ranker 665 may include a statistical component that produces a ranked list of intent/skill pairs with associated confidence scores. Each confidence score may indicate an adequacy of the skill's execution of the intent with respect to NLU results data associated with the skill. The post-NLU ranker 665 may operate one or more trained models configured to process the NLU results data, skill result data, and the other data in order to output ranked output data. The ranked output data may include an n-best list where the NLU hypotheses in the NLU results data are reordered such that the n-best list in the ranked output data represents a prioritized list of skills to respond to a user input as determined by the post-NLU ranker 665. The ranked output data may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 665 enables the system to better determine the best skill to execute the user input. For example, first and second NLU hypotheses in the NLU results data may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 665 (or other scheduling component such as orchestrator component 630) may solicit the first skill and the second skill to provide potential result data based on the first NLU hypothesis and the second NLU hypothesis, respectively. For example, the post-NLU ranker 665 may send the first NLU hypothesis to the first skill 690a along with a request for the first skill 690a to at least partially execute with respect to the first NLU hypothesis. The post-NLU ranker 665 may also send the second NLU hypothesis to the second skill 690b along with a request for the second skill 690b to at least partially execute with respect to the second NLU hypothesis. The post-NLU ranker 665 receives, from the first skill 690a, first result data generated from the first skill 690a's execution with respect to the first NLU hypothesis. The post-NLU ranker 665 also receives, from the second skill 690b, second results data generated from the second skill 690b's execution with respect to the second NLU hypothesis.

The post-NLU ranker 665 may consider the first skill result data and the second skill result data to alter the first confidence score and the second confidence score of the first NLU hypothesis and the second NLU hypothesis, respectively. That is, the post-NLU ranker 665 may generate a third confidence score based on the first result data and the first confidence score. The third confidence score may correspond to how likely the post-NLU ranker 665 determines the first skill will correctly respond to the user input. The post-NLU ranker 665 may also generate a fourth confidence score based on the second result data and the second confidence score. One skilled in the art will appreciate that a first difference between the third confidence score and the fourth confidence score may be greater than a second difference between the first confidence score and the second confidence score. The post-NLU ranker 665 may also consider the other data to generate the third confidence score and the fourth confidence score. While it has been described that the post-NLU ranker 665 may alter the confidence scores associated with first and second NLU hypotheses, one skilled in the art will appreciate that the post-NLU ranker 665 may alter the confidence scores of more than two NLU hypotheses. The post-NLU ranker 665 may select the result data associated with the skill 690 with the highest altered confidence score to be the data output in response to the current user input. The post-NLU ranker 665 may also consider the ASR output data to alter the NLU hypotheses confidence scores.

The orchestrator component 630 may, prior to sending the NLU results data to the post-NLU ranker 665, associate intents in the NLU hypotheses with skills 690. For example, if a NLU hypothesis includes a <PlayMusic> intent, the orchestrator component 630 may associate the NLU hypothesis with one or more skills 690 that can execute the <PlayMusic> intent. Thus, the orchestrator component 630 may send the NLU results data, including NLU hypotheses paired with skills 690, to the post-NLU ranker 665. In response to ASR output data corresponding to "what should I do for dinner today," the orchestrator component 630 may generates pairs of skills 690 with associated NLU hypotheses corresponding to:

Skill 1/NLU hypothesis including <Help> intent
    Skill 2/NLU hypothesis including <Order> intent
    Skill 3/NLU hypothesis including <DishType> intent The post-NLU ranker 665 queries each skill 690, paired with a NLU hypothesis in the NLU output data, to provide skill result data based on the NLU hypothesis with which it is associated. That is, with respect to each skill, the post-NLU ranker 665 colloquially asks each skill "if given this NLU hypothesis, what would you do with it." According to the above example, the post-NLU ranker 665 may send skills 690 the following data:

Skill 1: First NLU hypothesis including <Help> intent indicator
    Skill 2: Second NLU hypothesis including <Order> intent indicator
    Skill 3: Third NLU hypothesis including <DishType> intent indicator The post-NLU ranker 665 may query each of the skills 690 in parallel or substantially in parallel.

A skill 690 may provide the post-NLU ranker 665 with various data and indications in response to the post-NLU ranker 665 soliciting the skill 690 for result data. A skill 690 may simply provide the post-NLU ranker 665 with an indication of whether or not the skill can execute with respect to the NLU hypothesis it received. A skill 690 may also or alternatively provide the post-NLU ranker 665 with output data generated based on the NLU hypothesis it received. In some situations, a skill 690 may need further information in addition to what is represented in the received NLU hypothesis to provide output data responsive to the user input. In these situations, the skill 690 may provide the post-NLU ranker 665 with result data indicating slots of a framework that the skill 690 further needs filled or entities that the skill 690 further needs resolved prior to the skill 690 being able to provided result data responsive to the user input. The skill 690 may also provide the post-NLU ranker 665 with a command and/or computer-generated speech indicating how the skill 690 recommends the system solicit further information needed by the skill 690. The skill 690 may further provide the post-NLU ranker 665 with an indication of whether the skill 690 will have all needed information after the user provides additional information a single time, or whether the skill 690 will need the user to provide various kinds of additional information prior to the skill 690 having all needed information. According to the above example, skills 690 may provide the post-NLU ranker 665 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator The post-NLU ranker 665 uses the result data provided by the skills 690 to alter the NLU confidence scores. That is, the post-NLU ranker 665 uses the result data provided by the queried skills 690 to create larger differences between the NLU confidence scores generated by the NLU component 660. Without the post-NLU ranker 665, the system may not be confident enough to determine an output in response to a user input, for example when the NLU hypotheses associated with multiple skills are too close for the system to confidently determine a single skill 690 to invoke to respond to the user input. For example, if the system does not implement the post-NLU ranker 665, the system may not be able to determine whether to obtain output data from a general reference information skill or a medical information skill in response to a user input corresponding to "what is acne."

The post-NLU ranker 665 may prefer skills 690 that provide result data responsive to NLU hypotheses over skills 690 that provide result data corresponding to an indication that further information is needed, as well as skills 690 that provide result data indicating they can provide multiple responses to received NLU hypotheses. For example, the post-NLU ranker 665 may generate a first score for a first skill 690a that is greater than the first skill's NLU confidence score based on the first skill 690a providing result data including a response to a NLU hypothesis. For further example, the post-NLU ranker 665 may generate a second score for a second skill 690b that is less than the second skill's NLU confidence score based on the second skill 690b providing result data indicating further information is needed for the second skill 690b to provide a response to a NLU hypothesis. Yet further, for example, the post-NLU ranker 665 may generate a third score for a third skill 690c that is less than the third skill's NLU confidence score based on the third skill 690c providing result data indicating the third skill 690c can provide multiple responses to a NLU hypothesis.

The post-NLU ranker 665 may consider other data in determining scores. The other data may include rankings associated with the queried skills 690. A ranking may be a system ranking or a user-specific ranking. A ranking may indicate a veracity of a skill from the perspective of one or more users of the system. For example, the post-NLU ranker 665 may generate a first score for a first skill 690a that is greater than the first skill's NLU processing confidence score based on the first skill 690a being associated with a high ranking. For further example, the post-NLU ranker 665 may generate a second score for a second skill 690b that is less than the second skill's NLU processing confidence score based on the second skill 690b being associated with a low ranking.

The other data may include information indicating whether or not the user that originated the user input has enabled one or more of the queried skills 690. For example, the post-NLU ranker 665 may generate a first score for a first skill 690a that is greater than the first skill's NLU processing confidence score based on the first skill 690a being enabled by the user that originated the user input. For further example, the post-NLU ranker 665 may generate a second score for a second skill 690b that is less than the second skill's NLU processing confidence score based on the second skill 690b not being enabled by the user that originated the user input. When the post-NLU ranker 665 receives the NLU results data, the post-NLU ranker 665 may determine whether profile data, associated with the user and/or device that originated the user input, includes indications of enabled skills.

The other data may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 665 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 665 may increase the NLU processing confidence score associated with a first skill configured to output visual data and/or decrease the NLU processing confidence score associated with a second skill configured to output audio data.

The other data may include information indicating the type of device that originated the user input. For example, the device may correspond to a "hotel room" type if the device is located in a hotel room. If a user inputs a command corresponding to "order me food" to the device located in the hotel room, the post-NLU ranker 665 may increase the NLU processing confidence score associated with a first skill 690a corresponding to a room service skill associated with the hotel and/or decrease the NLU processing confidence score associated with a second skill 690b corresponding to a food skill not associated with the hotel.

The other data may include information indicating a location of the device and/or user that originated the user input. The system may be configured with skills 690 that may only operate with respect to certain geographic locations. For example, a user may provide a user input corresponding to "when is the next train to Portland." A first skill 690a may operate with respect to trains that arrive at, depart from, and pass through Portland, Oregon. A second skill 690b may operate with respect to trains that arrive at, depart from, and pass through Portland, Maine. If the device and/or user that originated the user input is located in Seattle, Washington, the post-NLU ranker 665 may increase the NLU processing confidence score associated with the first skill 690a and/or decrease the NLU processing confidence score associated with the second skill 690b. Likewise, if the device and/or user that originated the user input is located in Boston, Massachusetts, the post-NLU ranker 665 may increase the NLU processing confidence score associated with the second skill 690b and/or decrease the NLU processing confidence score associated with the first skill 690a.

The other data may include information indicating a time of day. The system may be configured with skills 690 that operate with respect to certain times of day. For example, a user may provide a user input corresponding to "order me food." A first skill 690a may generate first result data corresponding to breakfast. A second skill 690b may generate second result data corresponding to dinner. If the system(s) 120 receives the user input in the morning, the post-NLU ranker 665 may increase the NLU processing confidence score associated with the first skill 690a and/or decrease the NLU processing score associated with the second skill 690b. If the system(s) 120 receives the user input in the afternoon or evening, the post-NLU ranker 665 may increase the NLU processing confidence score associated with the second skill 690b and/or decrease the NLU processing confidence score associated with the first skill 690a.

The other data may include information indicating user preferences. The system may include multiple skills 690 configured to execute in substantially the same manner. For example, a first skill 690a and a second skill 690b may both be configured to order food from respective restaurants. The system may store a user preference (e.g., in the profile storage 670) that is associated with the user that provided the user input to the system components(s) 120 as well as indicates the user prefers the first skill 690a over the second skill 690b. Thus, when the user provides a user input that may be executed by both the first skill 690a and the second skill 690b, the post-NLU ranker 665 may increase the NLU processing confidence score associated with the first skill 690a and/or decrease the NLU processing confidence score associated with the second skill 690b.

The other data may include information indicating system usage history associated with the user that originated the user input. For example, the system usage history may indicate the user originates user inputs that invoke a first skill 690a more often than the user originates user inputs that invoke a second skill 690b. Based on this, if the present user input may be executed by both the first skill 690a and the second skill 690b, the post-NLU ranker 665 may increase the NLU processing confidence score associated with the first skill 690a and/or decrease the NLU processing confidence score associated with the second skill 690b.

It has been described that the post-NLU ranker 665 uses the other data to increase and decrease NLU confidence scores associated with various skills 690 that the post-NLU ranker 665 has already requested result data from. Alternatively, the post-NLU ranker 665 may use the other data to determine which skills 690 to request result data from. For example, the post-NLU ranker 665 may use the other data to increase and/or decrease NLU processing confidence scores associated with skills 690 associated with the NLU results data output by the NLU component 660. The post-NLU ranker 665 may select n-number of top scoring altered NLU processing confidence scores. The post-NLU ranker 665 may then request result data from only the skills 690 associated with the selected n-number of NLU processing confidence scores.

As described, the post-NLU ranker 665 queries multiple skills associated with the NLU results data to provide result data to the post-NLU ranker 665 prior to the post-NLU ranker 665 ultimately determining the skill 690 to be invoked to respond to the user input. Some of the skills 690 may provide result data indicating responses to NLU hypotheses while other skills 690 may providing result data indicating the skills cannot provide responsive data. Whereas a system not implementing the post-NLU ranker 665 may select one of the skills 690 that could not provide a response, the post-NLU ranker 665 only selects a skill 690 that provides the post-NLU ranker 665 with result data corresponding to a response, indicating further information is needed, or indicating multiple responses can be generated.

The post-NLU ranker 665 may select result data, associated with the skill 690 associated with the highest score, for output to the user. Alternatively, the post-NLU ranker 665 may output ranked output data indicating skills 690 and their respective post-NLU ranker rankings. Since the post-NLU ranker 665 receives result data, potentially corresponding to a response to the user input, from the skills 690 prior to the post-NLU ranker 665 selecting one of the skills or outputting the ranked output data, little to no latency occurs from the time skills provide result data and the time the system outputs responds to the user.

If the post-NLU ranker 665 selects result audio data to be output to a user and the system determines content should be output audibly, the post-NLU ranker 665 (or another component of the system(s) 120) may cause the device 110a and/or the device 110b to output audio corresponding to the result audio data. If the post-NLU ranker 665 selects result text data to output to a user and the system determines content should be output visually, the post-NLU ranker 665 (or another component of the system(s) 120) may cause the device 110b to display text corresponding to the result text data. If the post-NLU ranker 665 selects result audio data to output to a user and the system determines content should be output visually, the post-NLU ranker 665 (or another component of the system(s) 120) may send the result audio data to the ASR component 150. The ASR component 150 may generate output text data corresponding to the result audio data. The system(s) 120 may then cause the device 110b to display text corresponding to the output text data. If the post-NLU ranker 665 selects result text data to output to a user and the system determines content should be output audibly, the post-NLU ranker 665 (or another component of the system(s) 120) may send the result text data to the TTS component 680. The TTS component 680 may generate output audio data (corresponding to computer-generated speech) based on the result text data. The system(s) 120 may then cause the device 110a and/or the device 110b to output audio corresponding to the output audio data.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

As used herein, a "dialog," "dialog session," "session," or the like refers to various related user inputs and system responses, for example inputs and outputs related to an ongoing exchange between a user and the system.

A dialog may be goal-oriented, meaning the dialog is directed to the system performing a specific action requested by a user (such as figuring out what music the system should play). Alternatively, a dialog may not be goal-oriented, for example as part of a freeform conversation between the system and a user that may not have a definite end point or action in mind at the end of the conversation. For example, a user may ask a system "Alexa, tell me something interesting" or "Alexa, let's have a conversation." System components that control what actions the system takes in response to various user inputs of a dialog may sometimes be referred to as chatbots.

A user input and performance by the system of a corresponding action responsive to the user input, may be referred to as a dialog "turn." A dialog session identifier may be associated with multiple related turns corresponding to consecutive related user inputs. One user input may be considered related to a subsequent user input, thereby causing a single dialog session identifier to be associated with both user inputs, based on, for example, a length of time between receipt of the first user input and receipt of the subsequent user input, a length of time between performance of an action responsive to the first user input and receipt of the subsequent user input, and/or the substance of the user input or the system response.

The system(s) 100 may include a dialog manager component 672 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 672 may associate a dialog session identifier with the dialog upon identifying that the user is engaging in a dialog with the user. The dialog manager component 672 may track a user input and the corresponding system generated response to the user input as a turn. The dialog session identifier may correspond to multiple turns of user input and corresponding system generated response. The dialog manager component 672 may transmit data identified by the dialog session identifier directly to the orchestrator component 630 or other component. Depending on system configuration the dialog manager 672 may determine the appropriate system generated response to give to a particular utterance or user input of a turn. Or creation of the system generated response may be managed by another component of the system (e.g., the language output component 693, NLG 679, orchestrator component 630, etc.) while the dialog manager 672 selects the appropriate responses. Alternatively, another component of the system component(s) 120 may select responses using techniques discussed herein. The text of a system generated response may be sent to a TTS component 680 for creation of audio data corresponding to the response. The audio data may then be sent to a user device (e.g., device 110) for ultimate output to the user. Alternatively (or in addition) a dialog response may be returned in text or some other form.

The dialog manager 672 may receive the ASR hypothesis/hypotheses (i.e., text data) and make a semantic interpretation of the phrase(s) or statement(s) represented therein. That is, the dialog manager 672 determines one or more meanings associated with the phrase(s) or statement(s) represented in the text data based on words represented in the text data. The dialog manager 672 determines a goal corresponding to an action that a user desires be performed as well as pieces of the text data that allow a device (e.g., the device 110, the system component(s) 120, a skill 690, a skill support system(s) 125, etc.) to execute the intent. If, for example, the text data corresponds to "what is the weather," the dialog manager 672 may determine that that the system component(s) 120 is to output weather information associated with a geographic location of the device 110. In another example, if the text data corresponds to "turn off the lights," the dialog manager 672 may determine that the system component(s) 120 is to turn off lights associated with the device(s) 110 or the user(s) 105.

The dialog manager 672 may send the results data to one or more skill component(s) 690. If the results data includes a single hypothesis, the orchestrator component 630 may send the results data to the skill component(s) 690 associated with the hypothesis. If the results data includes an N-best list of hypotheses, the orchestrator component 630 may send the top scoring hypothesis to a skill component(s) 690 associated with the top scoring hypothesis.

The system component(s) 120 includes a language output component 693. The language output component 693 includes a natural language generation (NLG) component 679 and a text-to-speech (TTS) component 680. The NLG component 679 can generate text for purposes of TTS output to a user. For example, the NLG component 679 may generate text corresponding to commands corresponding to a particular action for the user to perform. The NLG component 679 may generate appropriate text for various outputs as described herein. The NLG component 679 may include one or more trained models configured to output text appropriate for a particular input. The text output by the NLG component 679 may become input for the TTS component 680. Alternatively or in addition, the TTS component 680 may receive text data from a skill component 690 or other system component for output.

The NLG component 679 may include a trained model. The NLG component 679 generates text data (or other natural language representation data) from dialog data received by the dialog manager 672 such that the output text data has a natural feel and, in some embodiments, includes words and/or phrases specifically formatted for a requesting individual. The NLG component 679 may use templates to formulate responses, and/or the NLG component 679 may include models trained from the various templates for forming the output text data. For example, the NLG component 679 may analyze transcripts of local news programs, television shows, sporting events, or any other media program to obtain common components of a relevant language and/or region. As one illustrative example, the NLG component 679 may analyze a transcription of a regional sports program to determine commonly used words or phrases for describing scores or other sporting news for a particular region. The NLG component 679 may further receive, as inputs, a dialog history, an indicator of a level of formality, and/or a command history or other user history such as the dialog history.

The NLG component 679 may generate dialog data based on one or more response templates. Further continuing the example above, the NLG component 679 may select a template in response to the question, "What is the weather currently like?" of the form: "The weather currently is $weather_information$." The NLG component 679 may analyze the logical form of the template to produce one or more textual responses including markups and annotations to familiarize the response that is generated. In some embodiments, the NLG component 679 may determine which response is the most appropriate response to be selected. The selection may, therefore, be based on past responses, past questions, a level of formality, and/or any other feature, or any other combination thereof. Responsive audio data representing the response generated by the NLG component 679 may then be generated using the text-to-speech component 680.

The TTS component 680 may generate audio data (e.g., synthesized speech) from text data using one or more different methods. Text data input to the TTS component 680 may come from a skill component 690, the orchestrator component 630, or another component of the system. In one method of synthesis called unit selection, the TTS component 680 matches text data against a database of recorded speech. The TTS component 680 selects matching units of recorded speech and concatenates the units together to form audio data. In another method of synthesis called parametric synthesis, the TTS component 680 varies parameters such as frequency, volume, and noise to create audio data including an artificial speech waveform. Parametric synthesis uses a computerized voice generator, sometimes called a vocoder.

The device 110 may include image and/or video capture components such as a camera or cameras to capture one or more images. The device 110 may include circuitry for digitizing the images and/or video for transmission to the system component(s) 120 as image data. The device 110 may further include circuitry for voice command-based control of the camera, allowing a user 105 to request capture of image or video data. The device 110 may process the commands locally or send audio data 611 representing the commands to the system component(s) 120 for processing, after which the system component(s) 120 may return output data that can cause the device 110 to engage its camera.

Upon receipt by the system component(s) 120, the image data 621 may be sent to an orchestrator component 630. The orchestrator component 630 may send the image data 621 to an image processing component that can perform computer vision functions such as object recognition, modeling, reconstruction, etc. For example, the image processing component may detect a person, face, etc. (which may then be identified using user recognition component 695). The device 110 may also include its own image processing component.

In some implementations, the image processing component can detect the presence of text in an image. In such implementations, the image processing component can recognize the presence of text, convert the image data to text data, and send the resulting text data via the orchestrator component 630 to the language processing component 692 for processing by the NLU component 660.

The system component(s) 120 may include a user recognition component 695 that recognizes one or more users using a variety of data. However, the disclosure is not limited thereto, and the device 110 may include a user recognition component 795 instead of and/or in addition to user recognition component 695 of the system component(s) 120 without departing from the disclosure. User recognition component 795 operates similarly to user recognition component 695.

The user-recognition component 695 may take as input the audio data 611 and/or text data output by the ASR component 150. The user-recognition component 695 may perform user recognition by comparing audio characteristics in the audio data 611 to stored audio characteristics of users. The user-recognition component 695 may also perform user recognition by comparing biometric data (e.g., fingerprint data, iris data, etc.), received by the system in correlation with the present user input, to stored biometric data of users assuming user permission and previous authorization. The user-recognition component 695 may further perform user recognition by comparing image data (e.g., including a representation of at least a feature of a user), received by the system in correlation with the present user input, with stored image data including representations of features of different users. The user-recognition component 695 may perform additional user recognition processes, including those known in the art.

The user-recognition component 695 determines scores indicating whether user input originated from a particular user. For example, a first score may indicate a likelihood that the user input originated from a first user, a second score may indicate a likelihood that the user input originated from a second user, etc. The user-recognition component 695 also determines an overall confidence regarding the accuracy of user recognition operations.

Output of the user-recognition component 695 may include a single user identifier corresponding to the most likely user that originated the user input. Alternatively, output of the user-recognition component 695 may include an N-best list of user identifiers with respective scores indicating likelihoods of respective users originating the user input. The output of the user-recognition component 695 may be used to inform NLU processing as well as processing performed by other components of the system.

The system 100 (either on device 110, system component(s) 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 670 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system component(s) 120 with permission to allow the skill to execute with respect to the user's natural language user inputs. If a user does not enable a skill, the system component(s) 120 may not invoke the skill to execute with respect to the user's natural language user inputs.

The profile storage 670 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 670 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 7:
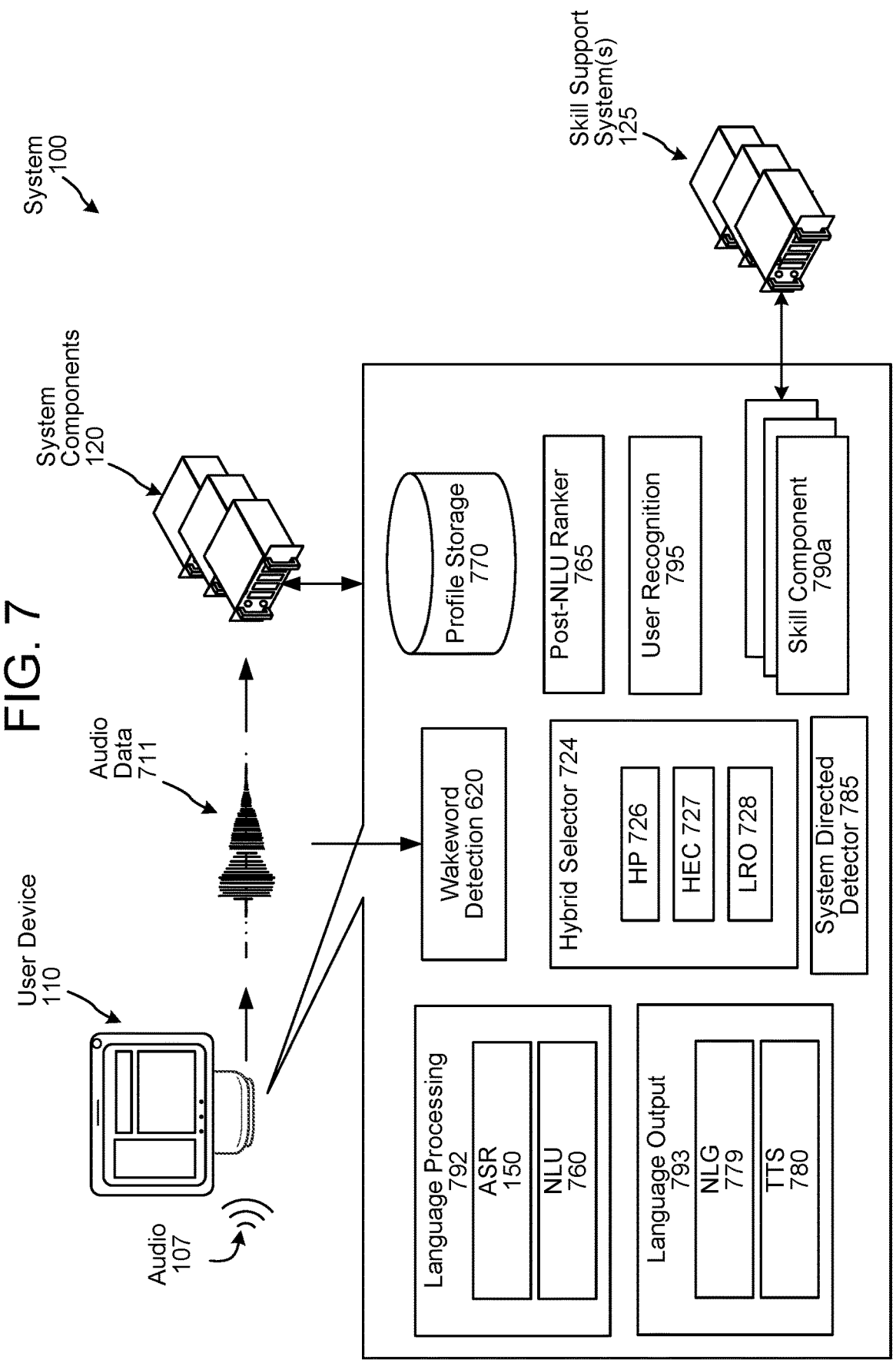
FIG. 7 is a conceptual diagram illustrating components that may be included in a device, according to embodiments of the present disclosure.

Although the components of FIG. 6 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. FIG. 7 illustrates such a configured user device 110.

In at least some embodiments, the system component(s) 120 may receive the audio data 611 from the device 110, to recognize speech corresponding to a spoken input in the received audio data 611, and to perform functions in response to the recognized speech. In at least some embodiments, these functions involve sending directives (e.g., commands), from the system component(s) 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system component(s) 120 over the network(s) 199, some or all of the functions capable of being performed by the system component(s) 120 may be performed by sending one or more directives over the network(s) 199 to the device 110, which, in turn, may process the directive(s) and perform one or more corresponding actions. For example, the system component(s) 120, using a remote directive that is included in response data (e.g., a remote response), may instruct the device 110 to output an audible response (e.g., using TTS processing performed by an on-device TTS component 780) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system component(s) 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

The user device 110 may include a wakeword detection component 620 configured to compare the audio data 611 to stored models used to detect a wakeword (e.g., "Alexa") that indicates to the device 110 that the audio data 611 is to be processed for determining NLU output data (e.g., slot data that corresponds to a named entity, label data, and/or intent data, etc.). In at least some embodiments, a hybrid selector 724, of the device 110, may send the audio data 611 to the wakeword detection component 620. If the wakeword detection component 620 detects a wakeword in the audio data 611, the wakeword detection component 620 may send an indication of such detection to the hybrid selector 724. In response to receiving the indication, the hybrid selector 724 may send the audio data 611 to the system component(s) 120 and/or the ASR component 150. The wakeword detection component 620 may also send an indication, to the hybrid selector 724, representing a wakeword was not detected. In response to receiving such an indication, the hybrid selector 724 may refrain from sending the audio data 611 to the system component(s) 120, and may prevent the ASR component 150 from further processing the audio data 611. In this situation, the audio data 611 can be discarded.

The device 110 may conduct its own speech processing using on-device language processing components, such as an SLU/language processing component 792 (which may include an ASR component 150 and an NLU 760), similar to the manner discussed herein with respect to the SLU component 692 (or ASR component 150 and the NLU component 660) of the system component(s) 120. Language processing component 792 may operate similarly to language processing component 692, ASR component 150 may operate similarly to ASR component 150 and NLU component 760 may operate similarly to NLU component 660. The device 110 may also internally include, or otherwise have access to, other components such as one or more skill components 790 capable of executing commands based on NLU output data or other results determined by the device 110/system component(s) 120 (which may operate similarly to skill components 690), a user recognition component 795 (configured to process in a similar manner to that discussed herein with respect to the user recognition component 695 of the system component(s) 120), profile storage 770 (configured to store similar profile data to that discussed herein with respect to the profile storage 670 of the system component(s) 120), or other components. In at least some embodiments, the profile storage 770 may only store profile data for a user or group of users specifically associated with the device 110. Similar to as described above with respect to skill component 690, a skill component 790 may communicate with a skill support system(s) 125. The device 110 may also have its own language output component 793 which may include NLG component 779 and TTS component 780. Language output component 793 may operate similarly to language processing component 693, NLG component 779 may operate similarly to NLG component 679 and TTS component 780 may operate similarly to TTS component 680.

In at least some embodiments, the on-device language processing components may not have the same capabilities as the language processing components of the system component(s) 120. For example, the on-device language processing components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s) 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system component(s) 120.

The hybrid selector 724, of the device 110, may include a hybrid proxy (HP) 726 configured to proxy traffic to/from the system component(s) 120. For example, the HP 726 may be configured to send messages to/from a hybrid execution controller (HEC) 727 of the hybrid selector 724. For example, command/directive data received from the system component(s) 120 can be sent to the HEC 727 using the HP 726. The HP 726 may also be configured to allow the audio data 711 to pass to the system component(s) 120 while also receiving (e.g., intercepting) this audio data 711 and sending the audio data 711 to the HEC 727.

In at least some embodiments, the hybrid selector 724 may further include a local request orchestrator (LRO) 728 configured to notify the ASR component 150 about the availability of new audio data 711 that represents user speech, and to otherwise initiate the operations of local language processing when new audio data 711 becomes available. In general, the hybrid selector 724 may control execution of local language processing, such as by sending "execute" and "terminate" events/commands. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system component(s) 120 and chooses to use that remotely-determined directive data.

Thus, when the audio data 711 is received, the HP 726 may allow the audio data 711 to pass through to the system component(s) 120 and the HP 726 may also input the audio data 711 to the on-device ASR component 150 by routing the audio data 711 through the HEC 727 of the hybrid selector 724, whereby the LRO 728 notifies the ASR component 150 of the audio data 711. At this point, the hybrid selector 724 may wait for response data from either or both of the system component(s) 120 or the local language processing components. However, the disclosure is not limited thereto, and in some examples the hybrid selector 724 may send the audio data 711 only to the local ASR component 150 without departing from the disclosure. For example, the device 110 may process the audio data 711 locally without sending the audio data 711 to the system component(s) 120.

The local ASR component 150 is configured to receive the audio data 711 from the hybrid selector 724, and to recognize speech in the audio data 711, and the local NLU component 760 is configured to determine a user intent from the recognized speech, and to determine how to act on the user intent by generating NLU output data which may include directive data (e.g., instructing a component to perform an action). Such NLU output data may take a form similar to that as determined by the NLU component 660 of the system component(s) 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 760) may be selected as usable to respond to a natural language user input, and local response data may be sent (e.g., local NLU output data, local knowledge base information, internet search results, and/or local directive data) to the hybrid selector 724, such as a "ReadyToExecute" response. The hybrid selector 724 may then determine whether to use directive data from the on-device components to respond to the natural language user input, to use directive data received from the system component(s) 120, assuming a remote response is even received (e.g., when the device 110 is able to access the system component(s) 120 over the network(s) 199), or to determine output audio requesting additional information from the user 105.

The device 110 and/or the system component(s) 120 may associate a unique identifier with each natural language user input. The device 110 may include the unique identifier when sending the audio data 711 to the system component(s) 120, and the response data from the system component(s) 120 may include the unique identifier to identify which natural language user input the response data corresponds.

In at least some embodiments, the device 110 may include, or be configured to use, one or more skill components 790 that may work similarly to the skill component(s) 690 implemented by the system component(s) 120. The skill component(s) 790 may correspond to one or more domains that are used in order to determine how to act on a spoken input in a particular way, such as by outputting a directive that corresponds to the determined intent, and which can be processed to implement the desired operation. The skill component(s) 790 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

A "domain" may include various skills relating to a particular area of interest. For example, a music domain may include various skills that can respond to a user's request to play music, enable a user to purchase music, etc. In another example, a smart-home domain may include skills that enable a user to control various home devices. A domain may correspond to different intents and entities. For example, the music domain may correspond to a Play Music intent, Add to Playlist intent, etc. As another example, the smart-home domain may correspond to Turn On intent, Turn Off intent, etc.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 790, a skill system 125, or a combination of a skill component 790 and a corresponding skill system 125.

Similar to the manner discussed with regard to FIG. 6, the local device 110 may be configured to recognize multiple different wakewords and/or perform different categories of tasks depending on the wakeword. Such different wakewords may invoke different processing components of local device 110 (not illustrated in FIG. 7). For example, detection of the wakeword "Alexa" by the wakeword detector 620 may result in sending audio data to certain language processing components 792/skills 790 for processing while detection of the wakeword "Computer" by the wakeword detector may result in sending audio data different language processing components 792/skills 790 for processing.

One or more of the herein described system component(s) 120 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. In another embodiment, the initial connection weights are assigned randomly. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data.

Figure 8:
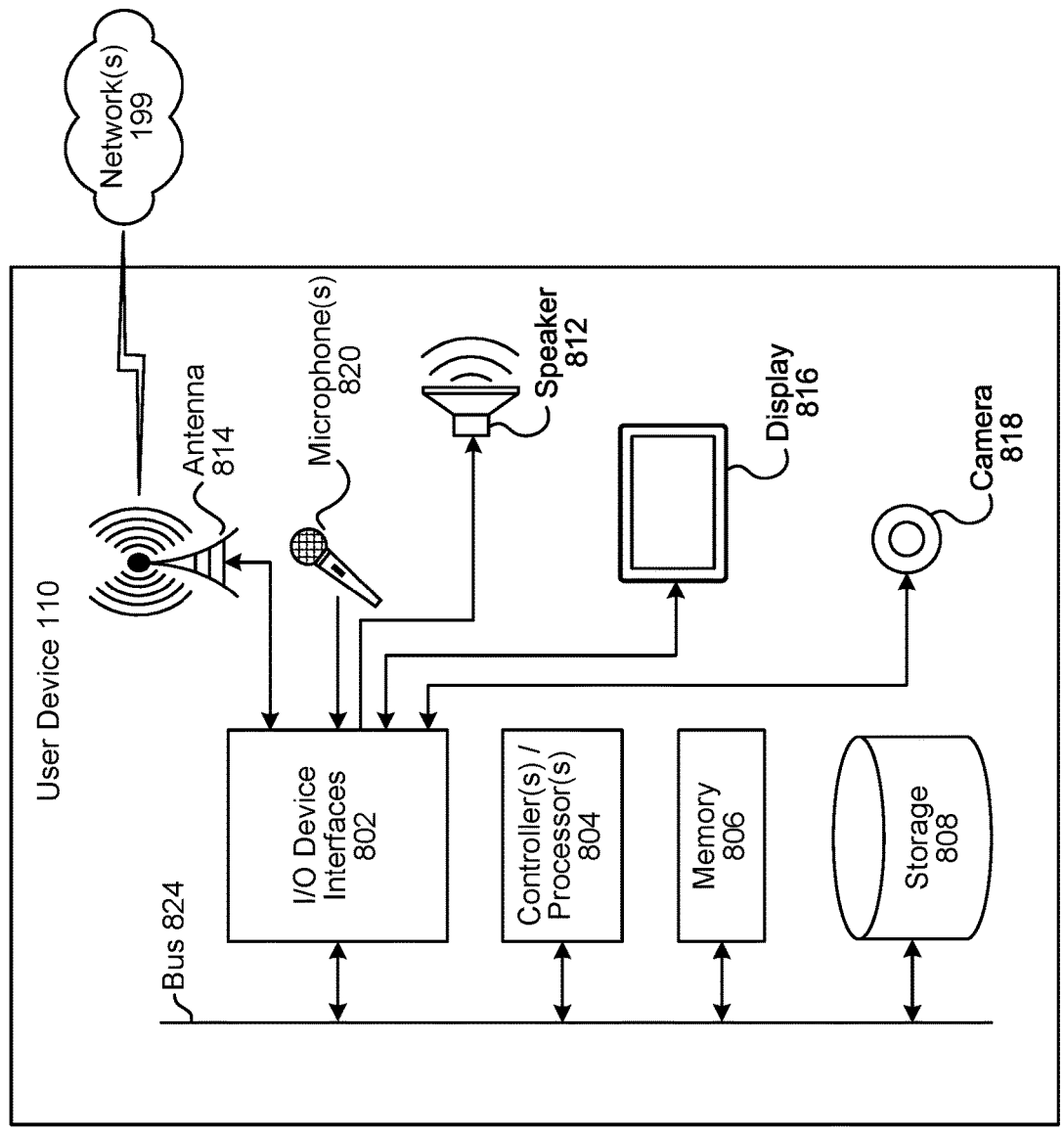
FIG. 8 is a block diagram conceptually illustrating example components of a device according to embodiments of the present disclosure.
Figure 9:
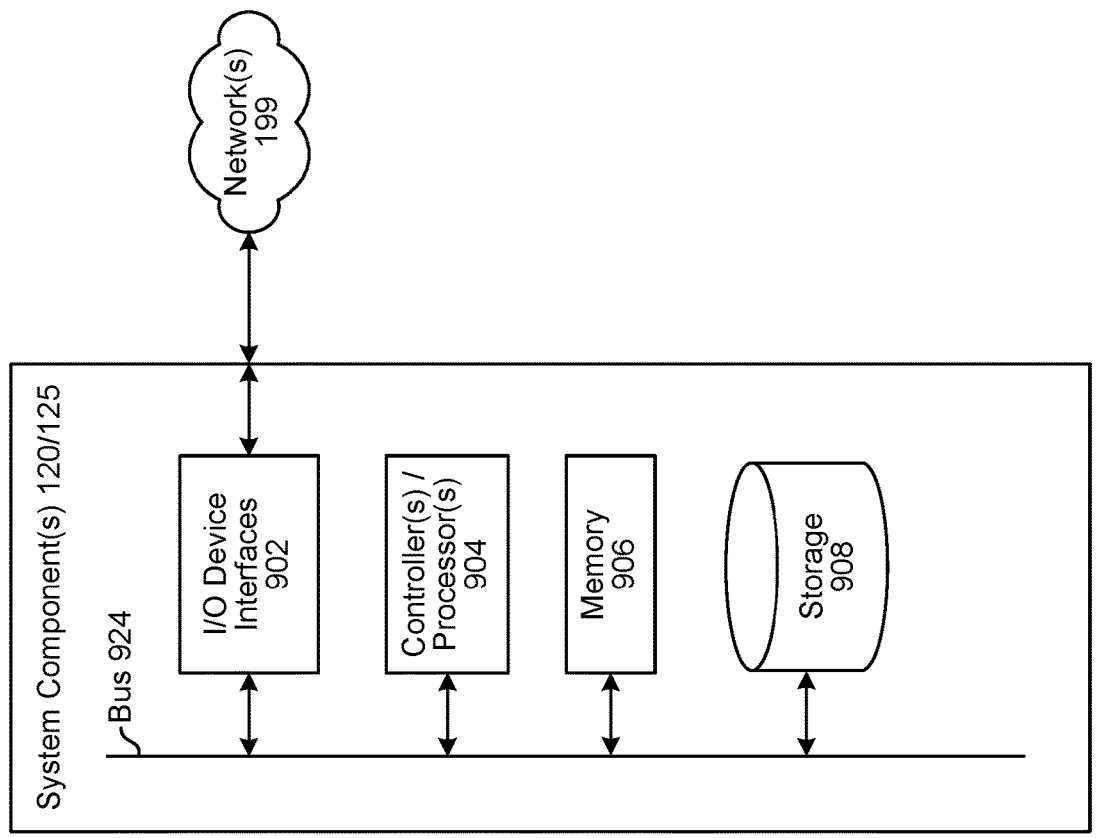
FIG. 9 is a block diagram conceptually illustrating example components of a system according to embodiments of the present disclosure.

FIG. 8 is a block diagram conceptually illustrating a device 110 that may be used with the system. FIG. 9 is a block diagram conceptually illustrating example components of a remote device, such as the system component(s) 120, which may assist with ASR processing, NLU processing, etc., and the skill support system(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system of the present disclosure, such as one or more system components 120 for performing ASR processing, one or more system components 120 for performing NLU processing, one or more skill systems 125 for performing actions responsive to user inputs, etc. In operation, each of these systems may include computer-readable and computer-executable instructions that reside on the respective device (120/125), as will be discussed further below.

Each of these devices (110/120/125) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/125) may also include a data storage component (808/908) for storing data and controller/processor-executable instructions. Each data storage component (808/908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (802/902).

Computer instructions for operating each device (110/120/125) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/125) includes input/output device interfaces (802/902). A variety of components may be connected through the input/output device interfaces (802/902), as will be discussed further below. Additionally, each device (110/120/125) may include an address/data bus (824/924) for conveying data among components of the respective device. Each component within a device (110/120/125) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110, the system component(s) 120, or the skill support system(s) 125 may include their own dedicated processors, memory, and/or storage. Alternatively, one or more of the components of the device(s) 110, the system component(s) 120, or the skill support system(s) 125 may utilize the I/O interfaces (802/902), processor(s) (804/904), memory (806/906), and/or storage (808/908) of the device(s) 110 system component(s) 120, or the skill support system(s) 125, respectively. Thus, the ASR component 150 may have its own I/O interface(s), processor(s), memory, and/or storage; the NLU component 660 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system component(s) 120, and the skill support system(s) 125, as described herein, are illustrative, and may be located as a stand-alone device or may be included, in whole or in part, as a component of a larger device or system.

Figure 10:
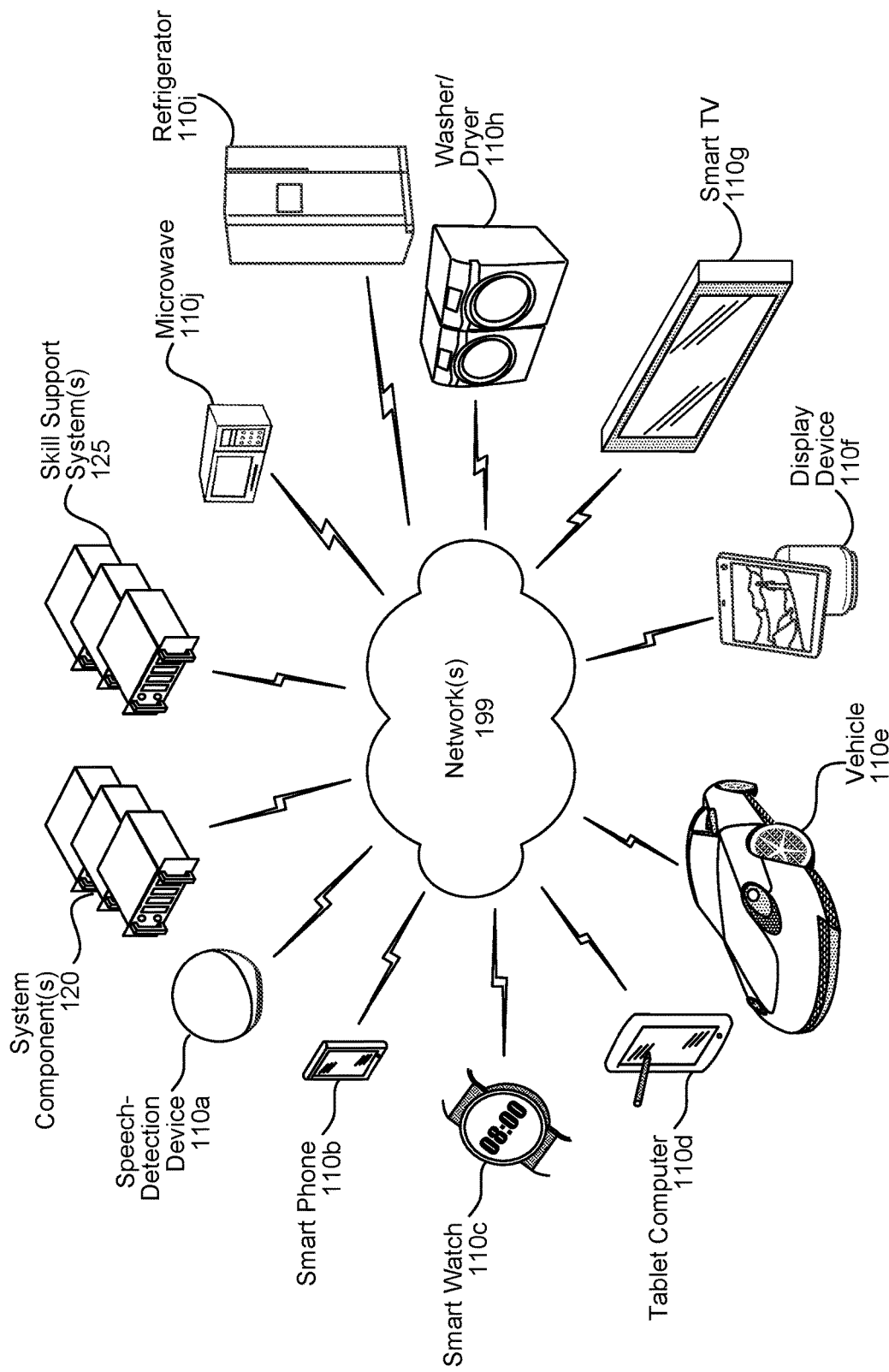
FIG. 10 illustrates an example of a computer network for use with the speech processing system.

As illustrated in FIG. 10, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system component(s) 120, the skill support system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 150, the NLU component 660, etc. of one or more system components 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving first audio data representing a first spoken input associated with a dialog session;
   determining dialog data corresponding to the dialog session, the dialog data representing at least one previous spoken input associated with the dialog session;
   determining topic data corresponding to the dialog session;
   generating a first prompt including the dialog data and the topic data, the first prompt being a command to a large language model (LLM) to determine, based on the dialog data and the topic data, context data relevant for transcribing the first spoken input;
   processing, using the LLM, the first prompt to determine the context data to include a first plurality of words, the first plurality of words being relevant for transcribing the first spoken input;
   determining first embedding data corresponding to the context data;
   determining second embedding data corresponding to the first audio data; and
   processing, using an automatic speech recognition (ASR) model, the first embedding data and the second embedding data to determine first ASR data representing a first transcription of the first spoken input.

2. The computer-implemented method of claim 1, further comprising:
   determining a second plurality of words included in the dialog data;
   determining a user profile corresponding to the first audio data;
   receiving interaction history data representing past user inputs, the interaction history data being associated with the user profile;
   determining a third plurality of words included in the interaction history data; and
   determining a fourth plurality of words that are unique between the second plurality of words and the third plurality of words,
   wherein the first prompt includes the fourth plurality of words instead of the dialog data.

3. The computer-implemented method of claim 1, further comprising:
   determining user profile data associated with the first audio data, the user profile data representing personalized words;
   determining third embedding data corresponding to the user profile data;
   processing the first embedding data, the second embedding data, and the third embedding data using an attention component configured to apply attention to a first portion of the first audio data based on the context data or the user profile data; and
   determining the first ASR data based at least in part on the processing using the attention component.

4. The computer-implemented method of claim 1, further comprising:
   determining a user profile associated with the first audio data;
   receiving personalized data associated with the user profile;
   receiving a second plurality of words corresponding to a domain; and
   determining a third plurality of words unique among the dialog data, the personalized data and the first plurality of words,
   wherein the first prompt includes the second plurality of words,
   wherein the first plurality of words includes at least a first word of the third plurality of words.

5. A computer-implemented method comprising:
   receiving first audio data representing a first spoken input;
   determining first data including a first plurality of words;

generating a first prompt including the first data, the first prompt being a command to a language model (LM) to determine context data, based on the first data, relevant for transcribing the first audio data;

processing, using the LM, the first prompt to determine second data including a second plurality of words;

determining first embedding data corresponding to the second data;

determining second embedding data corresponding to the first audio data; and processing the first embedding data and the second embedding data to determine a transcript of the first spoken input.

6. The computer-implemented method of claim 5, further comprising:

receiving interaction data representing a plurality of past user inputs;

determining a third plurality of words included in the interaction data, the third plurality of words being nouns; and determining the first data to include the third plurality of words, wherein the second data includes at least a first word of the third plurality of words.

7. The computer-implemented method of claim 5, further comprising:

determining the first audio data is associated with a dialog session;

determining dialog data associated with the dialog session, the dialog data representing at least one previous user input; and determining, using the dialog data, the first plurality of words that are unique.

8. The computer-implemented method of claim 5, wherein the first audio data is associated with a dialog session, and the method further comprises:

determining dialog data associated with dialog session, the dialog data representing at least one previous user input;

determining, using the dialog data, a topic corresponding to the dialog session; and determining the first data to include the topic, wherein the second plurality of words includes words related to the topic.

9. The computer-implemented method of claim 5, further comprising:

processing the second data to determine a third plurality of words that are unique words of the second plurality of words, wherein determining the first embedding data comprises processing, using an encoder, the third plurality of words to determine the first embedding data.

10. The computer-implemented method of claim 5, further comprising:

processing the first embedding data and the second embedding data using an attention component configured to apply attention to a portion of the first audio data based on at least one of the second plurality of words; and determining the transcript based on the processing using the attention component.

11. The computer-implemented method of claim 5, further comprising:

determining user profile data representing personalized words, the user profile data associated with the first audio data;

determining third embedding data corresponding to the user profile data; and processing the first embedding data, the second embedding data, and the third embedding data to determine the transcript.

12. The computer-implemented method of claim 5, further comprising:

receiving second audio data representing a second spoken input;

determining third data including a third plurality of words;

generating a second prompt including the third data, the second prompt being a command to the LM to determine context data, based on the third data, relevant for transcribing the second audio data;

processing, using the LM, the second prompt to determine third embedding data corresponding to a third plurality of words, the third embedding data being generated by an intermediate layer of the LM;

determining fourth embedding data corresponding to the second audio data; and processing the third embedding data and the fourth embedding data to determine a transcript of the second spoken input.

13. A system comprising:

at least one processor; and at least one memory including instructions that, when executed by the at least one processor, cause the system to:

receive first audio data representing a first spoken input;

determine first data including a first plurality of words;

generate a first prompt including the first data, the first prompt being a command to a language model (LM) to determine context data, based on the first data, relevant for transcribing the first audio data;

process, using the LM, the first prompt to determine second data including a second plurality of words;

determine first embedding data corresponding to the second data;

determine second embedding data corresponding to the first audio data; and process the first embedding data and the second embedding data to determine a transcript of the first spoken input.

14. The system of claim 13, wherein the at least one memory includes further instructions that, when executed by the at least one processor, further cause the system to:

receive interaction data representing a plurality of past user inputs;

determine a third plurality of words included in the interaction data, the third plurality of words being nouns; and determine the first data to include the third plurality of words, wherein the second data includes at least a first word of the third plurality of words.

15. The system of claim 13, wherein the at least one memory includes further instructions that, when executed by the at least one processor, further cause the system to:

determine the first audio data is associated with a dialog session;

determine dialog data associated with the dialog session, the dialog data representing at least one previous user input; and determine, using the dialog data, the first plurality of words that are unique.

16. The system of claim 13, wherein the first audio data is associated with a dialog session, and wherein the at least one memory includes further instructions that, when executed by the at least one processor, further cause the system to:
 determine dialog data associated with dialog session, the dialog data representing at least one previous user input;
 determine, using the dialog data, a topic corresponding to the dialog session; and
 determine the first data to include the topic,
 wherein the second plurality of words includes words related to the topic.

17. The system of claim 13, wherein the at least one memory includes further instructions that, when executed by the at least one processor, further cause the system to:
 process the second data to determine a third plurality of words that are unique words of the second plurality of words,
 wherein the instructions that cause the system to determine the first embedding data further causes the system to process, using an encoder, the third plurality of words to determine the first embedding data.

18. The system of claim 13, wherein the at least one memory includes further instructions that, when executed by the at least one processor, further cause the system to:
 process the first embedding data and the second embedding data using an attention component configured to apply attention to a portion of the first audio data based on at least one of the second plurality of words; and
 determine the transcript based on the processing using the attention component.

19. The system of claim 13, wherein the at least one memory includes further instructions that, when executed by the at least one processor, further cause the system to:
 determine user profile data representing personalized words, the user profile data associated with the first audio data;
 determine third embedding data corresponding to the user profile data; and
 process the first embedding data, the second embedding data, and the third embedding data to determine the transcript.

20. The system of claim 13, wherein the at least one memory includes further instructions that, when executed by the at least one processor, further cause the system to:
 receive second audio data representing a second spoken input;
 determine third data including a third plurality of words;
 generate a second prompt including the third data, the second prompt being a command to the LM to determine context data, based on the third data, relevant for transcribing the second audio data;
 process, using the LM, the second prompt to determine third embedding data corresponding to a third plurality of words, the third embedding data being generated by an intermediate layer of the LM;
 determine fourth embedding data corresponding to the second audio data; and
 process the third embedding data and the fourth embedding data to determine a transcript of the second spoken input.

\* \* \* \* \*